US011007978B2

(12) United States Patent
De Wind et al.

(10) Patent No.: US 11,007,978 B2
(45) Date of Patent: *May 18, 2021

(54) VEHICULAR ILLUMINATION SYSTEM WITH RECONFIGURABLE DISPLAY ELEMENT

(71) Applicant: MAGNA MIRRORS OF AMERICA, INC., Holland, MI (US)

(72) Inventors: Darryl P. De Wind, West Olive, MI (US); Justin E. Sobecki, Rockford, MI (US); Eric S. Deuel, Allendale, MI (US)

(73) Assignee: MAGNA MIRRORS OF AMERICA, INC., Holland, MI (US)

(*) Notice: Subject to any disclaimer, the term of this patent is extended or adjusted under 35 U.S.C. 154(b) by 0 days.

This patent is subject to a terminal disclaimer.

(21) Appl. No.: 15/929,325

(22) Filed: Apr. 27, 2020

(65) Prior Publication Data

US 2020/0254972 A1    Aug. 13, 2020

Related U.S. Application Data

(63) Continuation of application No. 16/390,070, filed on Apr. 22, 2019, now Pat. No. 10,632,968, which is a (Continued)

(51) Int. Cl.
  *B60R 25/24*     (2013.01)
  *B60Q 1/26*      (2006.01)
  (Continued)

(52) U.S. Cl.
  CPC .......... *B60R 25/241* (2013.01); *B60Q 1/0011* (2013.01); *B60Q 1/2619* (2013.01);
  (Continued)

(58) Field of Classification Search
  CPC .......... E05B 85/10; E05B 81/54; B60Q 1/32; B60Q 1/26; B60Q 1/00; B60R 25/01; B60R 25/20; F21S 8/10; G05B 19/00
  (Continued)

(56) References Cited

U.S. PATENT DOCUMENTS 1,096,452 A    5/1914   Perrin
1,114,559 A   10/1914   Weed
(Continued)

FOREIGN PATENT DOCUMENTS

CA    1063695 A    10/1979
DE    3624321 A1    2/1988
(Continued)

*Primary Examiner* — Nam V Nguyen
(74) *Attorney, Agent, or Firm* — Honigman LLP

(57) ABSTRACT

A vehicular illumination system includes an illumination module disposed at an exterior portion of a vehicle. The illumination module includes a reconfigurable display element and a light source operable to emit light. When the light source is operated, light emitted by the light source passes through the reconfigurable display element and the illumination module projects an icon established by the reconfigurable display element. The reconfigurable display element is reconfigurable to form the icon responsive to one of (i) a user selection of an icon and (ii) programming of the reconfigurable display element for an icon. When the light source is operated, light emitted by the light source passes through the reconfigurable display element and the illumination module projects the icon of the reconfigurable display element onto a surface exterior of the equipped vehicle.

37 Claims, 15 Drawing Sheets

Related U.S. Application Data continuation of application No. 15/482,870, filed on Apr. 10, 2017, now Pat. No. 10,266,151, which is a continuation of application No. 15/072,638, filed on Mar. 17, 2016, now Pat. No. 9,616,808, which is a continuation of application No. 14/456,166, filed on Aug. 11, 2014, now Pat. No. 9,290,970, which is a continuation of application No. 13/674,458, filed on Nov. 12, 2012, now Pat. No. 8,801,245.

(60) Provisional application No. 61/602,148, filed on Feb. 23, 2012, provisional application No. 61/592,743, filed on Jan. 31, 2012, provisional application No. 61/559,398, filed on Nov. 14, 2011.

(51) Int. Cl.
| | | |
|---|---|---|
| *B60Q 1/00* | (2006.01) | |
| *F21V 5/04* | (2006.01) | |
| *E05B 85/10* | (2014.01) | |
| *G07C 9/00* | (2020.01) | |
| *B60Q 1/32* | (2006.01) | |
| *B60R 25/01* | (2013.01) | |
| *B60R 25/20* | (2013.01) | |
| *E05B 81/54* | (2014.01) | |
| *F21Y 115/10* | (2016.01) | |

(52) U.S. Cl.
CPC ......... *B60Q 1/2665* (2013.01); *B60Q 1/2669* (2013.01); *B60Q 1/2696* (2013.01); *B60Q 1/32* (2013.01); *B60Q 1/323* (2013.01); *B60R 25/01* (2013.01); *B60R 25/209* (2013.01); *E05B 81/54* (2013.01); *E05B 85/10* (2013.01); *F21V 5/04* (2013.01); *G07C 9/00309* (2013.01); *B60Q 2400/40* (2013.01); *B60Q 2400/50* (2013.01); *F21Y 2115/10* (2016.08); *G07C 2009/00325* (2013.01)

(58) Field of Classification Search
USPC ............ 340/442, 445, 447, 5.61, 10.2, 5.72; 362/501
See application file for complete search history.

(56) References Cited

U.S. PATENT DOCUMENTS

| | | |
|---|---|---|
| 1,563,258 A | 11/1925 | Cunningham |
| 1,672,559 A | 6/1928 | Doble |
| RE17,274 E | 4/1929 | Porter |
| 2,010,138 A | 8/1935 | Condon |
| 2,135,262 A | 11/1938 | Schumacher |
| 2,263,382 A | 11/1941 | Gotzinger |
| 2,457,348 A | 12/1948 | Chambers |
| 2,514,989 A | 7/1950 | Buren |
| 2,561,582 A | 7/1951 | Marbel |
| 2,580,014 A | 12/1951 | Gazda |
| 2,636,419 A | 4/1953 | Kerr |
| 2,778,273 A | 1/1957 | Fellmeth |
| 2,911,177 A | 11/1959 | West |
| 3,104,274 A | 9/1963 | King |
| 3,131,250 A | 4/1964 | Ely |
| 3,146,296 A | 8/1964 | Fischer |
| 3,170,985 A | 2/1965 | Katulich |
| 3,175,463 A | 3/1965 | Seashore |
| 3,266,016 A | 8/1966 | Maru |
| 3,267,806 A | 8/1966 | Azegami |
| 3,280,701 A | 10/1966 | Donnelly et al. |
| 3,337,285 A | 8/1967 | Travis |
| 3,338,655 A | 8/1967 | Young |
| 3,375,053 A | 3/1968 | Ward |
| 3,389,952 A | 6/1968 | Tobin, Jr. |
| 3,404,935 A | 10/1968 | Creager |
| 3,408,136 A | 10/1968 | Travis |
| 3,424,517 A | 1/1969 | Budreck |
| 3,563,638 A | 2/1971 | Panozzo |
| 3,601,614 A | 8/1971 | Platzer |
| 3,610,739 A | 10/1971 | Seashore |
| 3,667,833 A | 6/1972 | Baldwin, Sr. |
| 3,708,222 A | 1/1973 | Stern |
| 3,764,201 A | 10/1973 | Haile |
| 3,806,232 A | 4/1974 | Gray |
| 3,826,563 A | 7/1974 | Davis |
| 3,881,811 A | 5/1975 | French |
| 3,887,788 A | 6/1975 | Seibel et al. |
| 3,909,117 A | 9/1975 | Takahashi et al. |
| 4,200,359 A | 4/1980 | Lawson |
| 4,223,983 A | 9/1980 | Bloom |
| 4,258,979 A | 3/1981 | Mahin |
| 4,264,144 A | 4/1981 | McCord |
| 4,268,120 A | 5/1981 | Jitsumori |
| 4,274,078 A | 6/1981 | Isobe et al. |
| 4,281,899 A | 8/1981 | Oskam |
| 4,293,191 A | 10/1981 | Kim |
| 4,303,308 A | 12/1981 | Kobrin |
| 4,306,770 A | 12/1981 | Marhauer |
| 4,311,362 A | 1/1982 | LaPorte |
| 4,311,363 A | 1/1982 | Marsalka et al. |
| 4,325,609 A | 4/1982 | Alford |
| 4,331,382 A | 5/1982 | Graff |
| 4,350,412 A | 9/1982 | Steenblik et al. |
| 4,435,042 A | 3/1984 | Wood et al. |
| 4,436,371 A | 3/1984 | Wood et al. |
| 4,436,372 A | 3/1984 | Schmidt et al. |
| 4,439,013 A | 3/1984 | Hagn et al. |
| 4,449,786 A | 5/1984 | McCord |
| 4,470,665 A | 9/1984 | Blom |
| 4,499,451 A | 2/1985 | Suzuki et al. |
| 4,526,446 A | 7/1985 | Adams |
| 4,549,786 A | 10/1985 | Albers et al. |
| 4,555,166 A | 11/1985 | Enomoto |
| 4,575,202 A | 3/1986 | McGuire |
| 4,588,267 A | 5/1986 | Pastore |
| 4,609,266 A | 9/1986 | Blom |
| 4,623,222 A | 11/1986 | Itoh et al. |
| 4,629,296 A | 12/1986 | White |
| 4,630,904 A | 12/1986 | Pastore |
| 4,674,849 A | 6/1987 | Stewart |
| 4,674,850 A | 6/1987 | Blom |
| 4,678,294 A | 7/1987 | Van Nostrand |
| 4,679,906 A | 7/1987 | Brandenburg |
| 4,712,879 A | 12/1987 | Lynam et al. |
| 4,715,701 A | 12/1987 | Urban |
| 4,721,364 A | 1/1988 | Itoh et al. |
| 4,727,302 A | 2/1988 | Mizuta et al. |
| 4,733,335 A | 3/1988 | Serizawa et al. |
| 4,733,336 A | 3/1988 | Skogler et al. |
| 4,770,522 A | 9/1988 | Alten |
| 4,773,740 A | 9/1988 | Kawakami et al. |
| D297,926 S | 10/1988 | Kesler |
| 4,793,690 A | 12/1988 | Gahan et al. |
| 4,799,768 A | 1/1989 | Gahan |
| 4,803,599 A | 2/1989 | Trine et al. |
| 4,824,231 A | 4/1989 | Quintana |
| 4,826,289 A | 5/1989 | Vandenbrink et al. |
| 4,828,379 A | 5/1989 | Parsons et al. |
| 4,853,283 A | 8/1989 | Skolnick |
| 4,859,046 A | 8/1989 | Traynor et al. |
| 4,882,466 A | 11/1989 | Friel |
| 4,882,565 A | 11/1989 | Gallmeyer |
| 4,906,075 A | 3/1990 | Matsumiya |
| 4,906,085 A | 3/1990 | Sugihara et al. |
| 4,913,542 A | 4/1990 | Adolfsson |
| 4,917,477 A | 4/1990 | Bechtel et al. |
| 4,917,485 A | 4/1990 | Baldwin, Sr. |
| 4,929,074 A | 5/1990 | Urban |
| 4,931,627 A | 6/1990 | Watts |
| 4,932,769 A | 6/1990 | Goosen |
| 4,932,770 A | 6/1990 | Caravaty |
| 4,948,242 A | 8/1990 | Desmond et al. |
| 4,951,179 A | 8/1990 | Machida |
| 4,989,964 A | 2/1991 | Meise |

(56) References Cited

U.S. PATENT DOCUMENTS

| | | |
|---|---|---|
| 5,005,962 A | 4/1991 | Edelman |
| 5,014,167 A | 5/1991 | Roberts |
| 5,016,996 A | 5/1991 | Ueno |
| 5,017,903 A | 5/1991 | Krippelz, Sr. |
| 5,022,747 A | 6/1991 | Polanyi et al. |
| 5,033,835 A | 7/1991 | Platzer, Jr. |
| 5,044,739 A | 9/1991 | do Espirito Santo |
| 5,050,977 A | 9/1991 | Platzer, Jr. |
| 5,052,792 A | 10/1991 | McDonough |
| 5,059,015 A | 10/1991 | Tran |
| 5,066,112 A | 11/1991 | Lynam et al. |
| 5,073,012 A | 12/1991 | Lynam |
| 5,076,673 A | 12/1991 | Lynam et al. |
| 5,076,674 A | 12/1991 | Lynam |
| 5,078,480 A | 1/1992 | Warszawski |
| 5,080,492 A | 1/1992 | Platzer, Jr. |
| 5,107,374 A | 4/1992 | Lupo et al. |
| 5,115,346 A | 5/1992 | Lynam |
| 5,115,352 A | 5/1992 | do Espirito Santo |
| 5,117,346 A | 5/1992 | Gard |
| 5,118,540 A | 6/1992 | Hutchison |
| 5,140,455 A | 8/1992 | Varaprasad et al. |
| 5,142,407 A | 8/1992 | Varaprasad et al. |
| 5,151,816 A | 9/1992 | Varaprasad et al. |
| 5,151,824 A | 9/1992 | O'Farrell |
| 5,166,833 A | 11/1992 | Shyu |
| 5,178,448 A | 1/1993 | Adams et al. |
| 5,179,471 A | 1/1993 | Caskey et al. |
| 5,183,099 A | 2/1993 | Bechu |
| 5,189,537 A | 2/1993 | O'Farrell |
| 5,193,029 A | 3/1993 | Schofield et al. |
| 5,207,492 A | 5/1993 | Roberts |
| 5,225,943 A | 7/1993 | Lupo |
| 5,233,461 A | 8/1993 | Dornan et al. |
| 5,237,458 A | 8/1993 | Polanyi et al. |
| 5,237,459 A | 8/1993 | Strauss |
| 5,239,405 A | 8/1993 | Varaprasad et al. |
| 5,247,395 A | 9/1993 | Martinez |
| 5,253,109 A | 10/1993 | O'Farrell et al. |
| 5,285,060 A | 2/1994 | Larson et al. |
| 5,295,021 A | 3/1994 | Swanson |
| 5,296,973 A | 3/1994 | Burke |
| 5,313,335 A | 5/1994 | Gray et al. |
| 5,327,288 A | 7/1994 | Wellington et al. |
| 5,340,503 A | 8/1994 | Varaprasad et al. |
| 5,354,965 A | 10/1994 | Lee |
| 5,355,245 A | 10/1994 | Lynam |
| 5,355,284 A | 10/1994 | Roberts |
| 5,361,190 A | 11/1994 | Roberts et al. |
| 5,371,659 A | 12/1994 | Pastrick et al. |
| 5,402,103 A | 3/1995 | Tashiro |
| 5,406,414 A | 4/1995 | O'Farrell et al. |
| 5,412,512 A | 5/1995 | Zebold et al. |
| 5,424,875 A | 6/1995 | Davis, II |
| 5,432,643 A | 7/1995 | Huang |
| 5,436,741 A | 7/1995 | Crandall |
| 5,437,931 A | 8/1995 | Tsai et al. |
| 5,438,487 A | 8/1995 | Schmid et al. |
| 5,446,576 A | 8/1995 | Lynam et al. |
| 5,448,397 A | 9/1995 | Tonar |
| D363,920 S | 11/1995 | Roberts et al. |
| 5,481,409 A | 1/1996 | Roberts |
| 5,497,305 A | 3/1996 | Pastrick et al. |
| 5,497,306 A | 3/1996 | Pastrick |
| 5,509,606 A | 4/1996 | Breithaupt et al. |
| 5,517,367 A | 5/1996 | Kim et al. |
| 5,523,877 A | 6/1996 | Lynam |
| 5,525,264 A | 6/1996 | Cronin et al. |
| 5,526,195 A | 6/1996 | Thomas |
| 5,528,422 A | 6/1996 | Roberts |
| 5,530,588 A | 6/1996 | Vivier |
| 5,535,056 A | 7/1996 | Caskey et al. |
| 5,550,677 A | 8/1996 | Schofield et al. |
| 5,557,467 A | 9/1996 | McColgan et al. |
| 5,559,640 A | 9/1996 | Vachss et al. |
| 5,563,744 A | 10/1996 | Matsumiya |
| 5,567,360 A | 10/1996 | Varaprasad et al. |
| 5,575,552 A | 11/1996 | Faloon et al. |
| 5,579,133 A | 11/1996 | Black et al. |
| 5,587,236 A | 12/1996 | Agrawal et al. |
| 5,587,699 A | 12/1996 | Faloon et al. |
| 5,594,222 A | 1/1997 | Caldwell |
| 5,594,593 A | 1/1997 | Milner |
| 5,610,756 A | 3/1997 | Lynam et al. |
| 5,619,374 A | 4/1997 | Roberts |
| 5,621,569 A | 4/1997 | Schlenke |
| 5,621,577 A | 4/1997 | Lang et al. |
| 5,632,551 A | 5/1997 | Roney et al. |
| 5,644,442 A | 7/1997 | Lemere |
| 5,649,756 A | 7/1997 | Adams et al. |
| 5,659,423 A | 8/1997 | Schierbeek et al. |
| 5,668,663 A | 9/1997 | Varaprasad et al. |
| 5,669,698 A | 9/1997 | Veldman et al. |
| 5,669,699 A | 9/1997 | Pastrick et al. |
| 5,669,704 A | 9/1997 | Pastrick |
| 5,669,705 A | 9/1997 | Pastrick et al. |
| 5,670,935 A | 9/1997 | Schofield et al. |
| 5,671,996 A | 9/1997 | Bos et al. |
| 5,689,370 A | 11/1997 | Tonar et al. |
| 5,691,855 A | 11/1997 | Lupkas |
| 5,715,093 A | 2/1998 | Schierbeek et al. |
| 5,722,836 A | 3/1998 | Younker |
| 5,724,187 A | 3/1998 | Varaprasad et al. |
| 5,751,489 A | 5/1998 | Caskey et al. |
| D394,833 S | 6/1998 | Muth |
| 5,760,962 A | 6/1998 | Schofield et al. |
| 5,784,211 A | 7/1998 | Mingledorff |
| 5,786,772 A | 7/1998 | Schofield et al. |
| 5,788,357 A | 8/1998 | Muth et al. |
| 5,790,298 A | 8/1998 | Tonar |
| 5,790,327 A | 8/1998 | Lee et al. |
| 5,793,542 A | 8/1998 | Kondo et al. |
| 5,796,094 A | 8/1998 | Schofield et al. |
| 5,796,176 A | 8/1998 | Kramer et al. |
| 5,796,532 A | 8/1998 | Kanazawa |
| 5,798,575 A | 8/1998 | O'Farrell et al. |
| 5,803,579 A | 9/1998 | Turnbull et al. |
| 5,805,367 A | 9/1998 | Kanazawa |
| 5,808,777 A | 9/1998 | Lynam et al. |
| 5,818,625 A | 10/1998 | Forgette et al. |
| 5,823,654 A | 10/1998 | Pastrick et al. |
| 5,825,527 A | 10/1998 | Forgette et al. |
| 5,835,294 A | 11/1998 | Minegishi |
| 5,838,505 A | 11/1998 | Palathingal |
| 5,847,889 A | 12/1998 | Komiyama et al. |
| 5,863,116 A | 1/1999 | Pastrick et al. |
| 5,864,434 A | 1/1999 | Taylor |
| 5,877,897 A | 3/1999 | Schofield et al. |
| 5,879,074 A | 3/1999 | Pastrick |
| D409,540 S | 5/1999 | Muth |
| 5,900,999 A | 5/1999 | Huizenga et al. |
| 5,910,854 A | 6/1999 | Varaprasad et al. |
| 5,922,176 A | 7/1999 | Caskey |
| 5,923,457 A | 7/1999 | Byker et al. |
| 5,929,786 A | 7/1999 | Schofield et al. |
| 5,938,320 A | 8/1999 | Crandall |
| 5,938,321 A | 8/1999 | Bos et al. |
| 5,959,367 A | 9/1999 | O'Farrell et al. |
| 5,980,050 A | 11/1999 | McCord |
| 5,986,364 A | 11/1999 | Bingle et al. |
| 6,002,511 A | 12/1999 | Varaprasad et al. |
| 6,005,724 A | 12/1999 | Todd |
| 6,007,207 A | 12/1999 | Liu |
| 6,007,222 A | 12/1999 | Thau |
| 6,030,084 A | 2/2000 | Schmidt |
| 6,032,323 A | 3/2000 | Smith et al. |
| 6,033,078 A | 3/2000 | Su et al. |
| 6,045,243 A | 4/2000 | Muth et al. |
| D425,466 S | 5/2000 | Todd et al. |
| 6,064,508 A | 5/2000 | Forgette et al. |
| 6,065,840 A | 5/2000 | Caskey et al. |
| D426,506 S | 6/2000 | Todd et al. |
| D426,507 S | 6/2000 | Todd et al. |
| D427,128 S | 6/2000 | Mathieu |

(56) References Cited

U.S. PATENT DOCUMENTS

| | | |
|---|---|---|
| 6,074,068 A | 6/2000 | Palathingal |
| 6,074,077 A | 6/2000 | Pastrick et al. |
| 6,076,948 A | 6/2000 | Bukosky et al. |
| D428,372 S | 7/2000 | Todd et al. |
| D428,373 S | 7/2000 | Todd et al. |
| 6,086,229 A | 7/2000 | Pastrick |
| 6,093,976 A | 7/2000 | Kramer et al. |
| D428,842 S | 8/2000 | Todd et al. |
| D429,202 S | 8/2000 | Todd et al. |
| D430,088 S | 8/2000 | Todd et al. |
| 6,097,023 A | 8/2000 | Schofield et al. |
| 6,099,155 A | 8/2000 | Pastrick et al. |
| 6,102,546 A | 8/2000 | Carter |
| 6,109,586 A | 8/2000 | Hoek |
| 6,111,683 A | 8/2000 | Cammenga et al. |
| 6,111,684 A | 8/2000 | Forgette et al. |
| 6,116,743 A | 9/2000 | Hoek |
| 6,124,647 A | 9/2000 | Marcus et al. |
| 6,124,886 A | 9/2000 | DeLine et al. |
| 6,132,072 A | 10/2000 | Turnbull et al. |
| 6,142,656 A | 11/2000 | Kurth |
| 6,146,003 A | 11/2000 | Thau |
| 6,149,287 A | 11/2000 | Pastrick et al. |
| 6,152,590 A | 11/2000 | Furst et al. |
| 6,154,306 A | 11/2000 | Varaprasad et al. |
| 6,163,083 A | 12/2000 | Kramer et al. |
| 6,164,564 A | 12/2000 | Franco et al. |
| 6,166,848 A | 12/2000 | Cammenga et al. |
| 6,170,956 B1 | 1/2001 | Rumsey et al. |
| 6,172,613 B1 | 1/2001 | DeLine et al. |
| 6,175,164 B1 | 1/2001 | O'Farrell et al. |
| 6,175,300 B1 | 1/2001 | Kendrick |
| 6,176,602 B1 | 1/2001 | Pastrick et al. |
| 6,178,034 B1 | 1/2001 | Allemand et al. |
| 6,184,800 B1 | 2/2001 | Lewis |
| 6,195,194 B1 | 2/2001 | Roberts et al. |
| 6,196,688 B1 | 3/2001 | Caskey et al. |
| 6,198,409 B1 | 3/2001 | Schofield et al. |
| 6,199,993 B1 | 3/2001 | Mou |
| 6,201,642 B1 | 3/2001 | Bos |
| 6,206,553 B1 | 3/2001 | Boddy et al. |
| 6,207,083 B1 | 3/2001 | Varaprasad et al. |
| 6,213,612 B1 | 4/2001 | Schnell et al. |
| 6,227,689 B1 * | 5/2001 | Miller ................. B60Q 1/2665 362/494 |
| 6,229,226 B1 | 5/2001 | Kramer et al. |
| 6,229,435 B1 | 5/2001 | Knapp et al. |
| 6,239,898 B1 | 5/2001 | Byker et al. |
| 6,243,218 B1 | 6/2001 | Whitehead |
| 6,244,716 B1 | 6/2001 | Steenwyk et al. |
| 6,245,262 B1 | 6/2001 | Varaprasad et al. |
| 6,250,148 B1 | 6/2001 | Lynam |
| 6,257,746 B1 | 7/2001 | Todd et al. |
| 6,260,608 B1 | 7/2001 | Kim |
| 6,264,353 B1 | 7/2001 | Caraher et al. |
| 6,270,225 B1 | 8/2001 | Goolsby |
| 6,276,821 B1 | 8/2001 | Pastrick et al. |
| 6,280,069 B1 | 8/2001 | Pastrick et al. |
| 6,286,965 B1 | 9/2001 | Caskey et al. |
| 6,291,905 B1 | 9/2001 | Drummond et al. |
| 6,294,989 B1 | 9/2001 | Schofield et al. |
| 6,296,379 B1 | 10/2001 | Pastrick |
| 6,299,333 B1 | 10/2001 | Pastrick et al. |
| 6,310,611 B1 | 10/2001 | Caldwell |
| 6,310,738 B1 | 10/2001 | Chu |
| 6,313,454 B1 | 11/2001 | Bos et al. |
| 6,315,419 B1 | 11/2001 | Platzer, Jr. |
| 6,318,870 B1 | 11/2001 | Spooner et al. |
| 6,320,282 B1 | 11/2001 | Caldwell |
| 6,329,925 B1 | 12/2001 | Skiver et al. |
| 6,335,548 B1 | 1/2002 | Roberts et al. |
| 6,336,737 B1 | 1/2002 | Thau |
| 6,340,849 B1 | 1/2002 | Kramer et al. |
| 6,340,850 B2 | 1/2002 | O'Farrell et al. |
| 6,341,523 B2 | 1/2002 | Lynam |
| 6,343,402 B1 | 2/2002 | Smith et al. |
| 6,347,880 B1 | 2/2002 | Furst et al. |
| 6,349,450 B1 | 2/2002 | Koops et al. |
| 6,353,392 B1 | 3/2002 | Schofield et al. |
| 6,356,376 B1 | 3/2002 | Tonar et al. |
| 6,359,274 B1 | 3/2002 | Nixon et al. |
| 6,362,548 B1 | 3/2002 | Bingle et al. |
| 6,363,326 B1 | 3/2002 | Scully |
| 6,379,013 B1 | 4/2002 | Bechtel et al. |
| 6,390,632 B1 | 5/2002 | Palathingal |
| 6,396,397 B1 | 5/2002 | Bos et al. |
| 6,396,408 B2 | 5/2002 | Drummond et al. |
| 6,397,976 B1 | 6/2002 | Hale et al. |
| 6,398,377 B1 | 6/2002 | Chou |
| 6,402,328 B1 | 6/2002 | Bechtel et al. |
| 6,416,208 B2 | 7/2002 | Pastrick et al. |
| 6,420,036 B1 | 7/2002 | Varaprasad et al. |
| 6,420,975 B1 * | 7/2002 | DeLine ............... H04M 1/6075 340/815.4 |
| 6,426,485 B1 | 7/2002 | Bulgajewski et al. |
| 6,428,172 B1 | 8/2002 | Hutzel et al. |
| 6,441,943 B1 | 8/2002 | Roberts et al. |
| 6,441,964 B1 | 8/2002 | Chu et al. |
| 6,445,287 B1 | 9/2002 | Schofield et al. |
| 6,447,130 B2 | 9/2002 | Chu |
| 6,449,082 B1 | 9/2002 | Agrawal et al. |
| 6,467,920 B2 | 10/2002 | Schnell et al. |
| 6,471,362 B1 | 10/2002 | Carter et al. |
| 6,472,979 B2 | 10/2002 | Schofield et al. |
| 6,476,358 B1 | 11/2002 | Lang et al. |
| 6,477,464 B2 | 11/2002 | McCarthy et al. |
| 6,498,620 B2 | 12/2002 | Schofield et al. |
| 6,501,387 B2 | 12/2002 | Skiver et al. |
| 6,504,142 B2 | 1/2003 | Nixon et al. |
| 6,511,192 B1 | 1/2003 | Henion et al. |
| 6,512,624 B2 | 1/2003 | Tonar et al. |
| 6,521,916 B2 | 2/2003 | Roberts et al. |
| 6,522,451 B1 | 2/2003 | Lynam |
| 6,523,976 B1 | 2/2003 | Turnbull et al. |
| 6,537,138 B2 | 3/2003 | Ohmori et al. |
| 6,550,103 B2 | 4/2003 | Koops et al. |
| 6,552,649 B1 | 4/2003 | Okada et al. |
| 6,568,839 B1 | 5/2003 | Pastrick et al. |
| 6,582,109 B2 | 6/2003 | Miller |
| 6,595,649 B2 | 7/2003 | Hoekstra et al. |
| 6,598,980 B2 | 7/2003 | Marusawa et al. |
| 6,598,982 B2 | 7/2003 | Witt |
| 6,612,708 B2 | 9/2003 | Chu |
| 6,615,438 B1 | 9/2003 | Franco et al. |
| 6,616,314 B2 | 9/2003 | Thau |
| 6,627,918 B2 | 9/2003 | Getz et al. |
| 6,642,851 B2 | 11/2003 | Deline et al. |
| 6,648,477 B2 | 11/2003 | Hutzel et al. |
| 6,650,457 B2 | 11/2003 | Busscher et al. |
| 6,657,767 B2 | 12/2003 | Bonardi et al. |
| 6,669,109 B2 | 12/2003 | Ivanov et al. |
| 6,669,267 B1 | 12/2003 | Lynam et al. |
| 6,685,864 B2 | 2/2004 | Bingle et al. |
| 6,690,268 B2 | 2/2004 | Schofield et al. |
| 6,700,692 B2 | 3/2004 | Tonar et al. |
| 6,717,109 B1 | 4/2004 | Macher et al. |
| 6,717,610 B2 | 4/2004 | Bos et al. |
| 6,717,712 B2 | 4/2004 | Lynam et al. |
| 6,719,215 B2 | 4/2004 | Drouillard |
| 6,731,205 B2 | 5/2004 | Schofield et al. |
| 6,737,629 B2 | 5/2004 | Nixon et al. |
| 6,742,904 B2 | 6/2004 | Bechtel et al. |
| 6,755,544 B2 | 6/2004 | Schnell et al. |
| 6,757,109 B2 | 6/2004 | Bos |
| D493,131 S | 7/2004 | Lawlor et al. |
| D493,394 S | 7/2004 | Lawlor et al. |
| 6,812,823 B2 | 11/2004 | Inaba et al. |
| 6,824,281 B2 | 11/2004 | Schofield et al. |
| 6,831,268 B2 | 12/2004 | Bechtel et al. |
| 6,832,848 B2 | 12/2004 | Pastrick |
| 6,848,818 B2 | 2/2005 | Huizenga |
| 6,855,431 B2 | 2/2005 | Varaprasad et al. |
| 6,882,287 B2 | 4/2005 | Schofield |
| 6,902,284 B2 | 6/2005 | Hutzel et al. |

(56) References Cited

U.S. PATENT DOCUMENTS

| | | |
|---|---|---|
| 6,907,643 B2 | 6/2005 | Koops et al. |
| 6,916,100 B2 | 7/2005 | Pavao |
| 6,919,796 B2 | 7/2005 | Boddy et al. |
| 6,932,483 B2 | 8/2005 | Strumolo et al. |
| 6,977,619 B2 | 12/2005 | March et al. |
| 6,979,090 B1 | 12/2005 | Wnuk |
| 7,004,593 B2 | 2/2006 | Weller et al. |
| 7,005,974 B2 | 2/2006 | McMahon et al. |
| 7,038,577 B2 | 5/2006 | Pawlicki et al. |
| 7,071,817 B2 | 7/2006 | Haselsteiner et al. |
| 7,073,914 B2 | 7/2006 | Pavao |
| 7,080,914 B1 | 7/2006 | Boddy |
| 7,097,312 B2 | 8/2006 | Platzer, Jr. |
| 7,106,392 B2 | 9/2006 | You |
| 7,126,456 B2 | 10/2006 | Boddy et al. |
| 7,167,294 B2 | 1/2007 | Lynam et al. |
| 7,167,796 B2 | 1/2007 | Taylor et al. |
| 7,168,830 B2 | 1/2007 | Pastrick et al. |
| 7,175,321 B1 | 2/2007 | Lopez |
| 7,184,190 B2 | 2/2007 | McCabe et al. |
| 7,195,381 B2 | 3/2007 | Lynam et al. |
| 7,249,860 B2 | 7/2007 | Kulas et al. |
| 7,255,451 B2 | 8/2007 | McCabe et al. |
| 7,267,448 B2 | 9/2007 | Schmidt et al. |
| 7,274,501 B2 | 9/2007 | McCabe et al. |
| 7,289,037 B2 | 10/2007 | Uken et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,334,922 B2 | 2/2008 | Bonardi et al. |
| 7,338,177 B2 | 3/2008 | Lynam |
| 7,339,149 B1 | 3/2008 | Schofield et al. |
| 7,342,707 B2 | 3/2008 | Roberts et al. |
| 7,345,680 B2 | 3/2008 | David |
| 7,349,143 B2 | 3/2008 | Tonar et al. |
| 7,370,983 B2 | 5/2008 | DeWind et al. |
| 7,372,611 B2 | 5/2008 | Tonar et al. |
| 7,377,675 B2 | 5/2008 | Pastrick et al. |
| 7,391,563 B2 | 6/2008 | McCabe et al. |
| 7,400,435 B2 | 7/2008 | Byers et al. |
| 7,407,203 B2 | 8/2008 | Huizenga et al. |
| 7,420,756 B2 | 9/2008 | Lynam |
| 7,423,522 B2 | 9/2008 | O'Brien et al. |
| 7,492,281 B2 | 2/2009 | Lynam et al. |
| 7,517,099 B2 | 4/2009 | Hannah |
| 7,526,103 B2 | 4/2009 | Schofield et al. |
| 7,581,859 B2 | 9/2009 | Lynam |
| 7,626,749 B2 | 12/2009 | Baur et al. |
| 7,636,188 B2 | 12/2009 | Baur et al. |
| 7,679,489 B2 | 3/2010 | Chen |
| 7,748,856 B2 | 7/2010 | Zhao |
| 7,819,442 B2 | 10/2010 | Ieda et al. |
| 7,824,045 B2 | 11/2010 | Zhao |
| 7,887,204 B2 | 2/2011 | Zhao |
| 7,934,844 B1 | 5/2011 | Zhao |
| 7,944,371 B2 | 5/2011 | Foote et al. |
| 8,058,977 B2 | 11/2011 | Lynam |
| 8,077,011 B2 | 12/2011 | McBride et al. |
| 8,102,279 B2 | 1/2012 | Foote et al. |
| 8,224,313 B2 | 7/2012 | Howarter et al. |
| 8,242,896 B2 | 8/2012 | Lynam |
| 8,269,615 B2 | 9/2012 | Ieda et al. |
| 8,287,164 B2 | 10/2012 | Fehn et al. |
| 8,305,235 B2 | 11/2012 | Foote et al. |
| 8,333,492 B2 | 12/2012 | Dingman et al. |
| 8,525,697 B2 | 9/2013 | Foote et al. |
| 8,801,245 B2 | 8/2014 | De Wind et al. |
| 8,807,807 B2 | 8/2014 | Wheeler et al. |
| 8,851,720 B2 | 10/2014 | Lee |
| 9,178,371 B2 | 11/2015 | Koelsch |
| 9,283,900 B2 * | 3/2016 | DeLine ............... B60R 11/0217 |
| 9,290,970 B2 | 3/2016 | De Wind et al. |
| 9,321,395 B2 | 4/2016 | Ammar et al. |
| 9,406,179 B2 | 8/2016 | Ayeva et al. |
| 9,575,481 B2 | 2/2017 | Newman et al. |
| 9,616,808 B2 | 4/2017 | De Wind et al. |
| 10,266,151 B2 | 4/2019 | De Wind et al. |
| 10,632,968 B2 | 4/2020 | De Wind et al. |
| 2002/0036828 A1 | 3/2002 | Wong |
| 2002/0105741 A1 | 8/2002 | Platzer |
| 2002/0159169 A1 | 10/2002 | McCord |
| 2002/0159270 A1 | 10/2002 | Lynam et al. |
| 2003/0043589 A1 | 3/2003 | Blank |
| 2003/0117731 A1 | 6/2003 | Platzer |
| 2004/0032638 A1 | 2/2004 | Tonar et al. |
| 2004/0032675 A1 | 2/2004 | Weller et al. |
| 2004/0032676 A1 | 2/2004 | Drummond et al. |
| 2004/0165291 A1 | 8/2004 | Platzer |
| 2004/0264011 A1 | 12/2004 | Lynam |
| 2005/0047162 A1 | 3/2005 | Baek |
| 2005/0078389 A1 | 4/2005 | Kulas et al. |
| 2005/0083577 A1 | 4/2005 | Varaprasad et al. |
| 2005/0099693 A1 | 5/2005 | Schofield et al. |
| 2005/0134441 A1 | 6/2005 | Somuah |
| 2005/0134983 A1 | 6/2005 | Lynam |
| 2005/0232469 A1 | 10/2005 | Schofield et al. |
| 2005/0248859 A1 | 11/2005 | Platzer |
| 2006/0038418 A1 | 2/2006 | Huizenga et al. |
| 2006/0050018 A1 | 3/2006 | Hutzel et al. |
| 2006/0056086 A1 | 3/2006 | Hannah |
| 2006/0061008 A1 | 3/2006 | Karner et al. |
| 2006/0125919 A1 | 6/2006 | Camilleri et al. |
| 2006/0126150 A1 | 6/2006 | Tonar et al. |
| 2006/0171704 A1 | 8/2006 | Bingle et al. |
| 2006/0181772 A1 | 8/2006 | Byers et al. |
| 2006/0184297 A1 | 8/2006 | Higgins-Luthman |
| 2006/0268440 A1 | 11/2006 | Platzer |
| 2007/0040649 A1 | 2/2007 | Dulgerian et al. |
| 2007/0058257 A1 | 3/2007 | Lynam |
| 2007/0182536 A1 | 8/2007 | Prywes |
| 2007/0206388 A1 | 9/2007 | Misawa et al. |
| 2007/0285789 A1 | 12/2007 | Lindahl et al. |
| 2008/0212189 A1 | 9/2008 | Baur et al. |
| 2008/0225421 A1 | 9/2008 | Platzer |
| 2008/0304170 A1 | 12/2008 | Zhao |
| 2009/0040306 A1 | 2/2009 | Foote et al. |
| 2009/0115631 A1 | 5/2009 | Foote et al. |
| 2009/0237820 A1 | 9/2009 | McCabe et al. |
| 2009/0302995 A1 | 12/2009 | Park |
| 2010/0007463 A1 | 1/2010 | Dingman et al. |
| 2010/0026475 A1 | 2/2010 | Hwang |
| 2010/0039691 A1 | 2/2010 | Thomas et al. |
| 2010/0088855 A1 | 4/2010 | Ruse et al. |
| 2010/0140244 A1 | 6/2010 | Chander et al. |
| 2010/0234071 A1 | 9/2010 | Shabtay et al. |
| 2010/0321757 A1 | 12/2010 | Cammenga et al. |
| 2010/0321946 A1 | 12/2010 | Dingman et al. |
| 2011/0029777 A1 | 2/2011 | Murakami et al. |
| 2011/0057773 A1 | 3/2011 | Newman et al. |
| 2011/0060480 A1 | 3/2011 | Mottla et al. |
| 2011/0112969 A1 | 5/2011 | Zaid et al. |
| 2011/0148575 A1 | 6/2011 | Sobecki et al. |
| 2011/0260845 A1 | 10/2011 | Henion et al. |
| 2012/0081915 A1 | 4/2012 | Foote et al. |
| 2012/0252480 A1 | 10/2012 | Krutt et al. |
| 2012/0259546 A1 | 10/2012 | Kim |
| 2012/0326888 A1 | 12/2012 | Lynam |
| 2013/0109404 A1 | 5/2013 | Husney |
| 2014/0022811 A1 | 1/2014 | Wheeler et al. |
| 2014/0191859 A1 | 7/2014 | Koelsch |
| 2015/0232034 A1 | 8/2015 | Weller et al. |

FOREIGN PATENT DOCUMENTS

| | | |
|---|---|---|
| DE | 3743072 A1 | 7/1989 |
| DE | 4026578 A1 | 4/1992 |
| DE | 10054315 A1 | 5/2002 |
| EP | 0210757 A2 | 2/1987 |
| EP | 0310261 A1 | 4/1989 |
| EP | 0356099 A2 | 2/1990 |
| EP | 0443185 A2 | 8/1991 |
| EP | 0551802 A1 | 7/1993 |
| EP | 0728618 A2 | 8/1996 |
| EP | 0729864 A1 | 9/1996 |

(56) References Cited

FOREIGN PATENT DOCUMENTS

| | | | |
|---|---|---|---|
| EP | 0791503 | A2 | 8/1997 |
| EP | 0917987 | A1 | 5/1999 |
| FR | 2551005 | | 3/1985 |
| FR | 2628042 | A1 | 9/1989 |
| GB | 1172382 | A | 11/1969 |
| GB | 2161440 | A | 1/1986 |
| JP | 362075619 | | 4/1987 |
| JP | 62105103 | | 5/1987 |
| JP | 1186443 | | 7/1989 |
| JP | 1208245 | | 8/1989 |
| JP | 491539 | | 8/1992 |
| JP | 08268188 | | 10/1996 |
| JP | 0681836 | | 3/1997 |
| JP | 10086899 | | 4/1998 |
| KR | 2002092059 | | 12/2002 |
| WO | 1995030495 | | 11/1995 |
| WO | 2001081956 | A1 | 11/2001 |
| WO | 2004026633 | A2 | 4/2004 |
| WO | 2004047421 | A2 | 6/2004 |
| WO | 2004103772 | A2 | 12/2004 |
| WO | 2005086777 | A2 | 9/2005 |
| WO | 2006017019 | A1 | 2/2006 |
| WO | 2006124682 | A2 | 11/2006 |
| WO | 2007005942 | A2 | 1/2007 |
| WO | 2008051910 | A2 | 5/2008 |
| WO | 2008137634 | A1 | 11/2008 |

\* cited by examiner

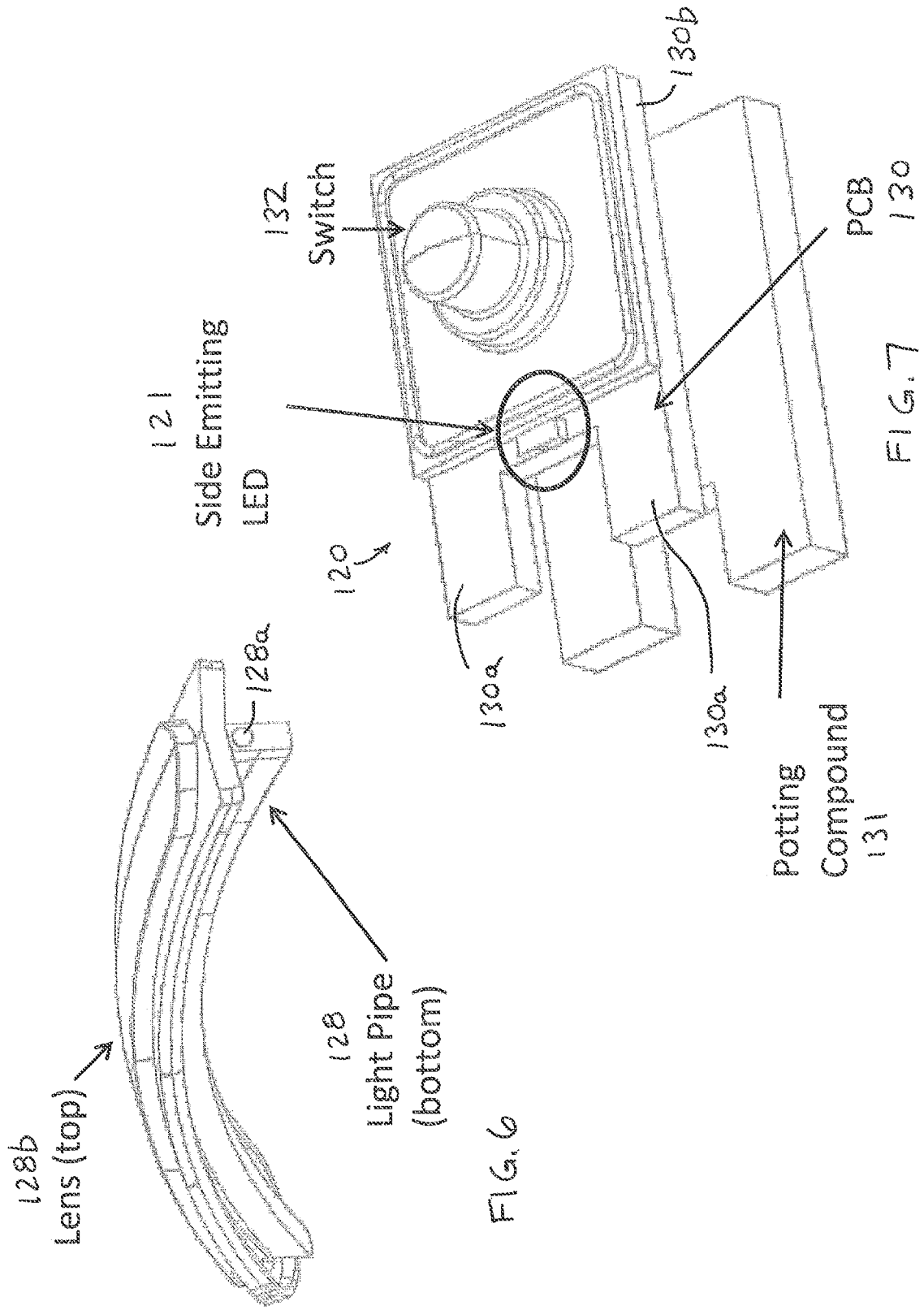

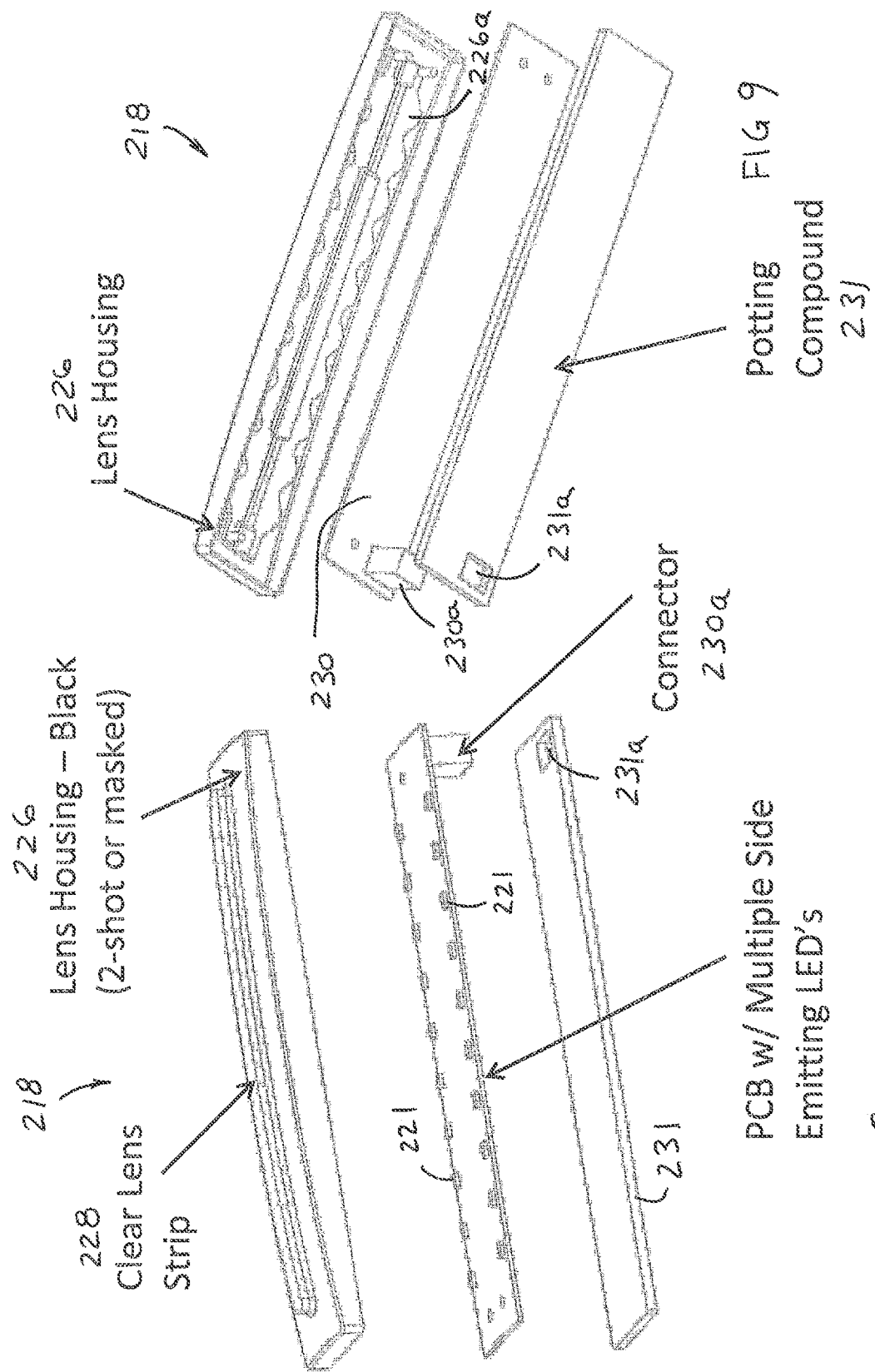

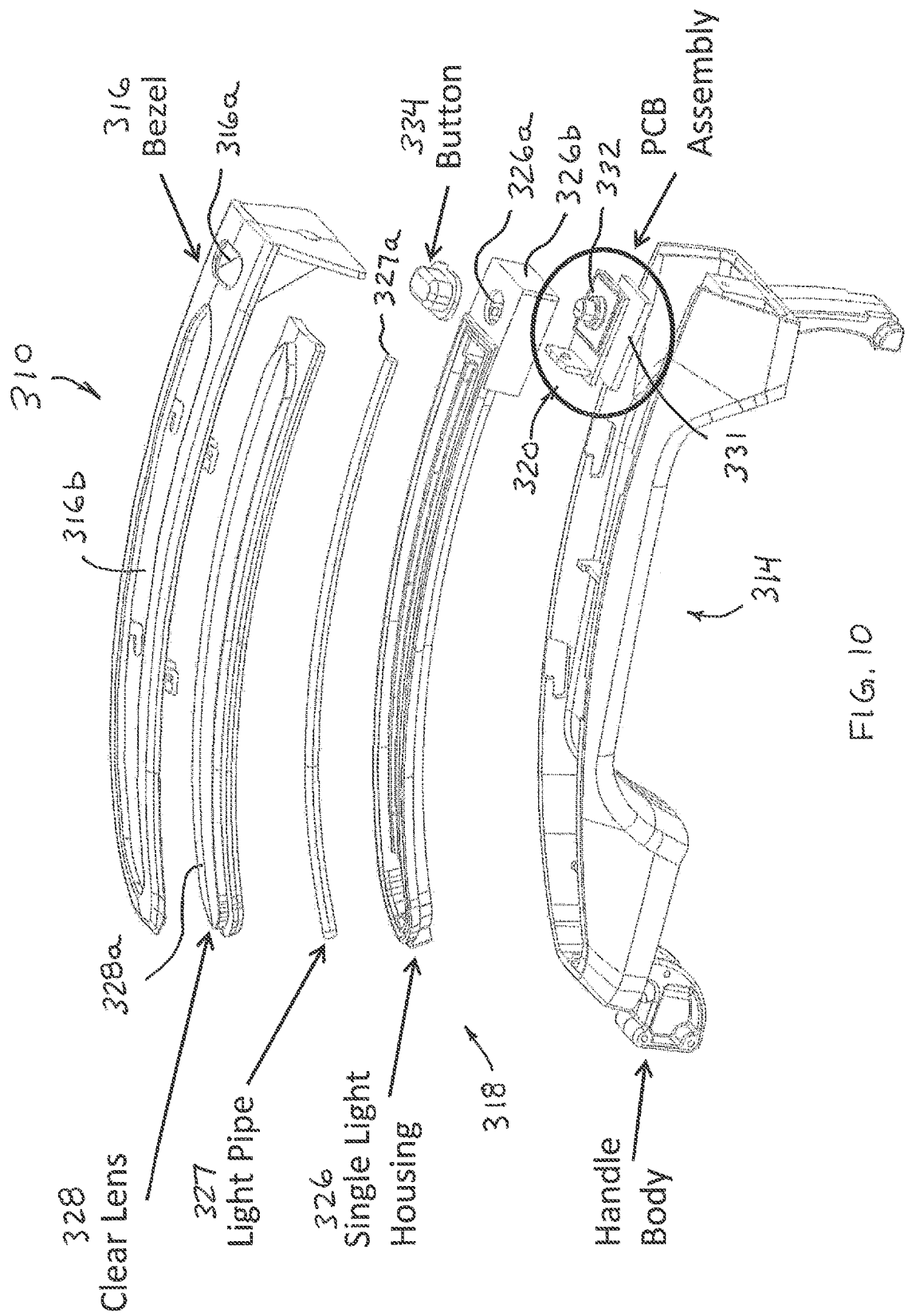

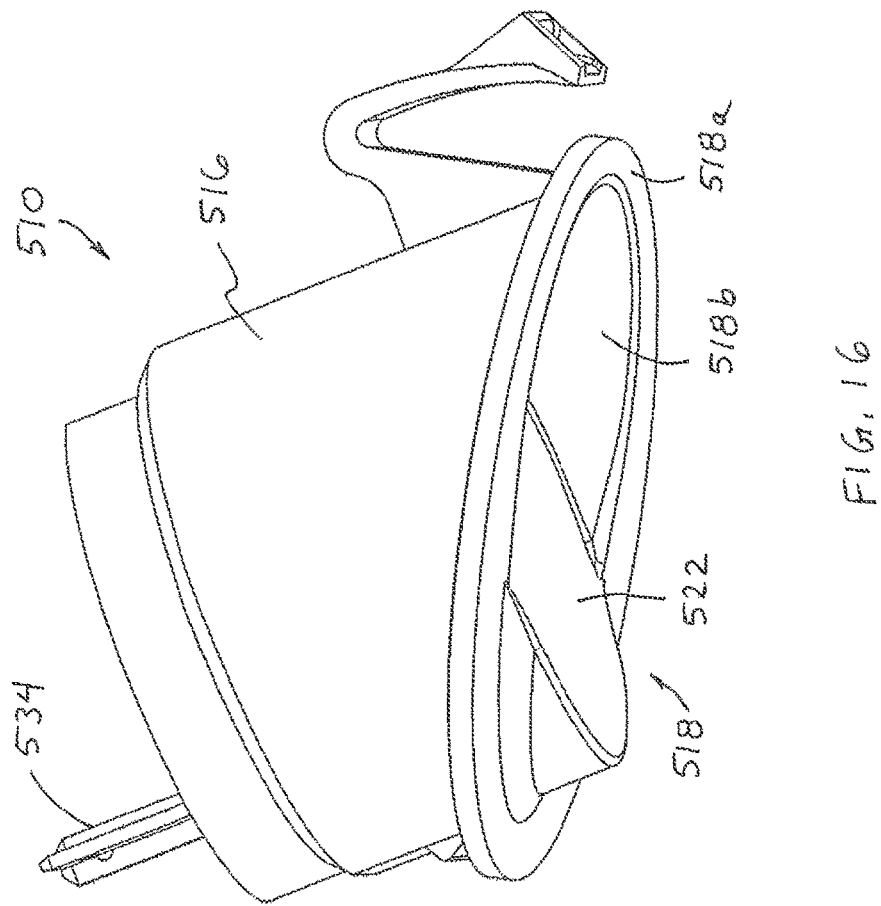
FIG. 16
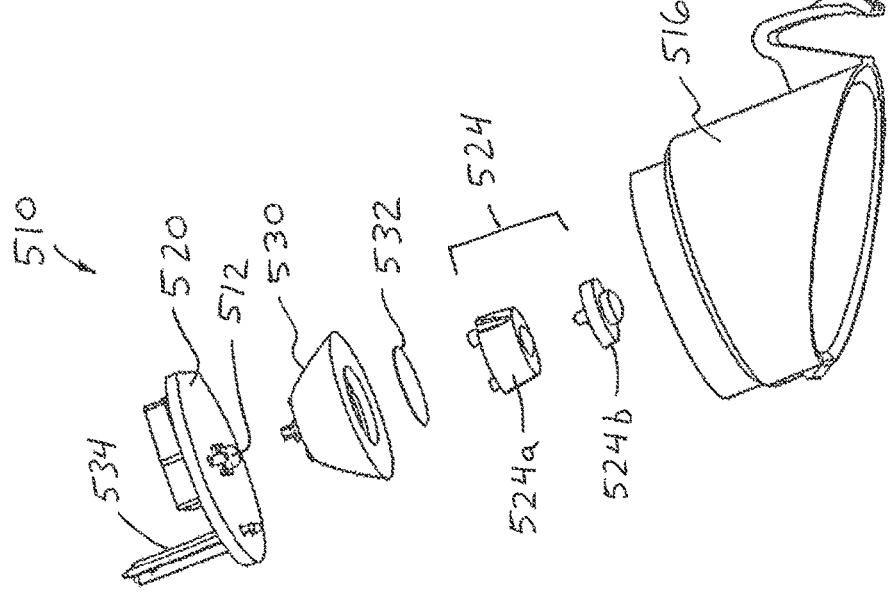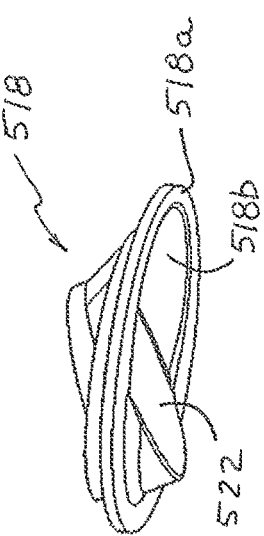
FIG. 17

US 11,007,978 B2

VEHICULAR ILLUMINATION SYSTEM WITH RECONFIGURABLE DISPLAY ELEMENT

CROSS REFERENCE TO RELATED APPLICATIONS

The present application is a continuation of U.S. patent application Ser. No. 16/390,070, filed Apr. 22, 2019, now U.S. Pat. No. 10,632,968, which is a continuation of U.S. patent application Ser. No. 15/482,870, filed Apr. 10, 2017, now U.S. Pat. No. 10,266,151, which is a continuation of U.S. patent application Ser. No. 15/072,638, filed Mar. 17, 2016, now U.S. Pat. No. 9,616,808, which is a continuation of U.S. patent application Ser. No. 14/456,166, filed Aug. 11, 2014, now U.S. Pat. No. 9,290,970, which is a continuation of U.S. patent application Ser. No. 13/674,458, filed Nov. 12, 2012, now U.S. Pat. No. 8,801,245, which claims the filing benefits of U.S. provisional applications, Ser. No. 61/602,148, filed Feb. 23, 2012, Ser. No. 61/592,743, filed Jan. 31, 2012, and Ser. No. 61/559,398, filed Nov. 14, 2011, which are hereby incorporated herein by reference in their entireties.

FIELD OF THE INVENTION

The present invention relates to door handles for vehicles and, more particularly, to an exterior door handle for opening a side door of a vehicle.

BACKGROUND OF THE INVENTION

A door handle for a vehicle door typically includes a handle portion that is pivotable relative to a base portion, whereby pivotal movement of the handle portion pulls at a cable or rod to electrically trigger or move a latch mechanism to release the latch and open the door. It is known to provide illumination or light sources at the side of the vehicle, such as to provide security lighting or convenience lighting at the side of the vehicle. For example, such lighting devices are described in U.S. Pat. Nos. 6,349,450; 6,550,103; 5,371,659; 5,669,699; 5,823,654 and 5,497,305, which are hereby incorporated herein by reference in their entireties. Typically, such lighting devices provide illumination along the side of the vehicle and down to the ground at the side of the vehicle. Such illumination thus may have glare or bright spots at the side of the vehicle.

SUMMARY OF THE INVENTION

The present invention provides an illumination module or device for a vehicle, such as for an exterior door handle assembly, for providing illumination at the door handle of the vehicle to indicate operation of a security system of the vehicle.

According to an aspect of the present invention, a door handle assembly for a door of a vehicle includes a base portion mountable to the vehicle door and a handle portion that is disposed at the base portion and is movable or pivotable relative to the base portion and the vehicle door. The door handle assembly includes an illumination module comprising at least one illumination source and an iconistic/icon element and a cover element. The illumination source (such as, for example, a light emitting diode or electroluminescence light source or the like), when operated, backlights the icon element so that an icon of the icon element is viewable through the cover element at an exterior surface of the handle portion. The icon of the icon element comprises a security icon and the illumination module is operable to backlight the security icon when a security system of the vehicle is operational.

Optionally, an illumination module may provide lighting at or along the exterior of the door handle to enhance the viewability of the door handle when illuminated in low ambient lighting conditions. The illumination module may include a light pipe that extends along an exterior portion of the door handle, and may be operable responsive to a passive entry system or key fob signal or the like. The illumination module may include a door locking switch or button that is actuatable by a user grasping or touching the door handle exterior of the vehicle, such that the illumination module provides a common circuit element or circuit board for illumination of the door handle and for unlocking of the vehicle door and optionally for operation of a passive entry system of the door and/or vehicle.

These and other objects, advantages, purposes and features of the present invention will become apparent upon review of the following specification in conjunction with the drawings.

BRIEF DESCRIPTION OF THE DRAWINGS

FIG. 6 is a perspective view of a lens and light pipe sub-assembly of the door handle assembly of FIG. 5;

FIG. 7 is a perspective view of a light module of the door handle assembly of FIG. 5;

FIGS. 8 and 9 are exploded perspective views of another lens and light sub-assembly suitable for use in a door handle assembly of the present invention;

FIG. 10 is an exploded perspective view of another door handle assembly in accordance with the present invention;

FIG. 16 is a perspective view of a ground illumination and projection light module in accordance with the present invention;

FIG. 17 is an exploded perspective view of the ground illumination and projection light module of FIG. 16;

DESCRIPTION OF THE PREFERRED EMBODIMENTS

Figure 1:
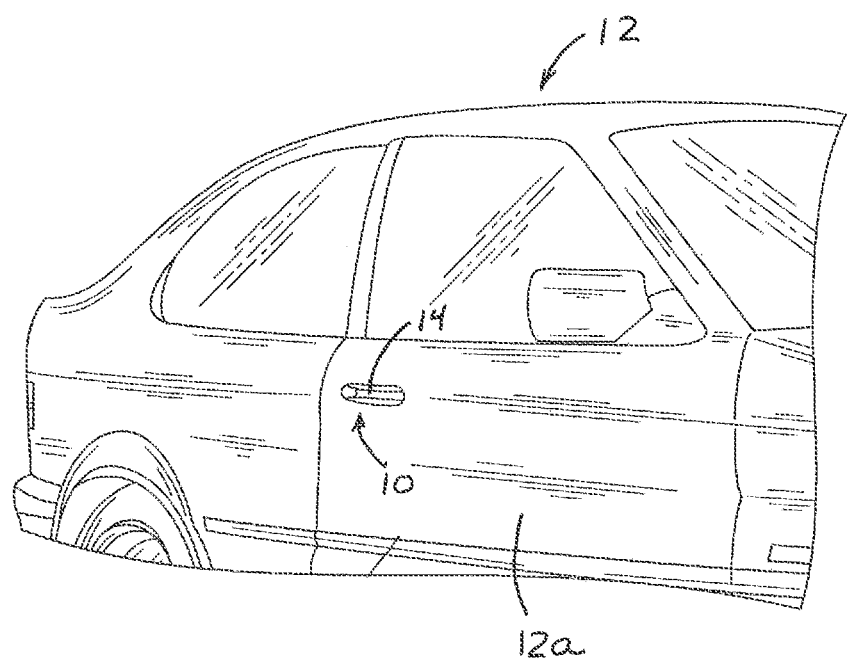
FIG. 1 is a perspective view of a vehicle with a door handle assembly of the present invention.

Referring now to the drawings and the illustrative embodiments depicted therein, a vehicle door handle assembly 10 is mountable to a door 12a of a vehicle 12 and operable to release a latch mechanism (not shown) of the door 12a to open the vehicle door (FIG. 1). Vehicle door handle assembly 10 includes a handle portion 14 that is disposed at the door and that is pivotable or movable or adjustable relative to the door or to a second or front base portion or bracket mounted to the door. Door handle assembly 10 includes at least one illumination module 16 at the strap portion 14 for providing illumination or backlighting of a security indicator or other indicator or icon or logo or the like of the illumination module, as discussed below.

Door handle assembly 10 may comprise any suitable type of door handle assembly, and may include or incorporate aspects of the door handle assemblies described in U.S. Pat. No. 7,407,203, and/or PCT Application No. PCT/US08/62347, filed May 2, 2008 and published Nov. 13, 2008 as International Publication No. WO 2008/137634, and/or U.S. patent application Ser. No. 12/499,183, filed Jul. 8, 2009 and published Jan. 14, 2010 as U.S. Publication No. US-2010-0007463; Ser. No. 12/499,183, filed Oct. 12, 2009 and published Apr. 15, 2010 as U.S. Publication No. US-2010-0088855; and/or Ser. No. 12/976,594, filed Dec. 22, 2010, now U.S. Pat. No. 8,786,401, which are hereby incorporated herein by reference in their entireties. For example, handle assembly 10 may include a strap or handle portion 14 that is pivotable or movable or laterally movable relative to the door to move an actuating lever or member or arm or bell crank or the like, which in turn moves a cable or rod or linkage or the like to actuate or release the latch mechanism of the door to open the vehicle door. Although shown in FIG. 1 as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door, such as a handle assembly of the types described in U.S. Pat. Nos. 6,349,450; 6,550,103 and/or 6,907,643, which are hereby incorporated herein by reference in their entireties) or other type of vehicle door handle assembly, while remaining within the spirit and scope of the present invention.

Figure 2:
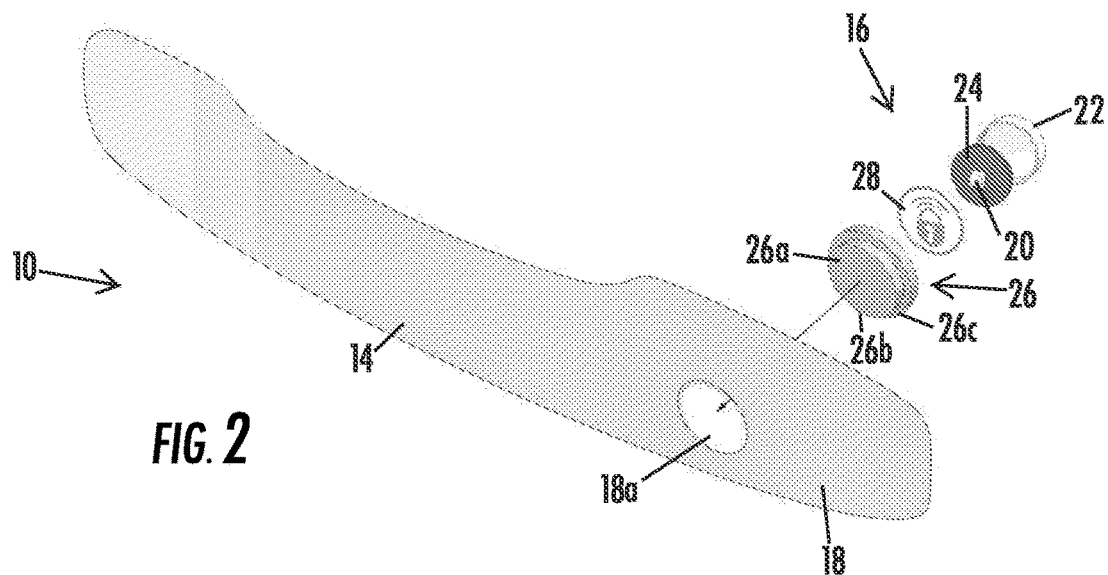
FIG. 2 is an exploded perspective view of a door handle assembly with a security beacon in accordance with the present invention.

Optionally, and desirably, and as shown in FIGS. 1 and 2, illumination module 16 may be disposed at or near an end 18 of handle portion 14. Illumination module 16 includes at least one illumination source or light source 20 (such as a light emitting diode (LED) or electroluminescence light source or the like) that is operable to emit illumination, such as in response to a triggering or activating device or event. For example, the illumination source may be actuatable in response to at least one of a touch of the door handle, a movement of the strap or handle portion, actuation of a remote keyless entry module, or passive entry device, a motion detection at the vehicle, an insertion of a key into a keyhole at the door handle, and/or activation or deactivation or operation of a security system of the vehicle. Preferably, the illumination source is deactuatable following a period of time after actuation of the illumination source. Optionally, the light module and/or illumination source or sources may have a dimming control feature or function, such that the illumination source, when activated, is ramped up or progressively powered up to its full illumination state, and when deactivated, is ramped down or dimmed or progressively powered down to its deactivated state.

The illumination source may comprise any suitable illumination source, such as one or more light emitting diodes (LEDs), such as white light-emitting LEDs or high intensity power LEDs (such as the types described in U.S. Pat. Nos. 7,195,381 and/or 6,690,268, which are hereby incorporated herein by reference in their entireties) or organic light emitting diodes (OLEDs) or electroluminescent light sources or the like. The illumination source may comprise a substantially white light-emitting illumination source, or may comprise a colored light-emitting illumination source (or a white light-emitting illumination source may emit light that passes through a color filter or the like) to provide color illumination (such as blue or other color as desired) at the door handle area depending on the particular application of the door handle assembly and illumination module. For example, the illumination module may emit or transmit colored light that may match or correspond to the interior and/or exterior lighting of the particular vehicle to which the door handle assembly is mounted.

In the illustrated embodiment (and with reference to FIG. 2), illumination module 16 comprises a small, self-contained module that includes a base portion 22 that receives or supports a circuit element 24 (at which illumination source or LED 20 is established) and an outer cover or housing portion 26 that substantially encases the illumination source and circuitry of the illumination module 16. An iconistic element or icon element or optic film or template 28 or the like is disposed between the illumination source 20 and the cover 26, such that, when the illumination source is activated, the icon formed at the template or film 28 is backlit so as to be viewable through or at the cover 26 by a person viewing the door handle assembly from outside of the vehicle.

The cover 26 is partially received in or at or through an aperture 18a established at the end portion 18 of handle 14, whereby an outer wall or surface 26a of cover 26 may substantially correspond to the contours of the door handle assembly at the illumination module such that the door handle assembly has a substantially continuous outer surface or wall at the illumination module. As shown in FIG. 2, the cover 26 is shaped or configured or formed so that an outer, narrower diameter or reduced dimensioned portion 26b is received through aperture 18a, while a larger diameter or increased dimensioned portion 26c limits insertion of the cover through the aperture 18 from inside the handle assembly. The height or dimension of the narrower portion 26b that extends from the larger portion 26c may be selected or sized to generally correspond to the thickness of the wall of the door handle, so that, when the cover is inserted into and seated at the aperture 18a of the handle 14, the outer surface 26a of cover 26 is generally flush with the outer surface of the handle portion 14. The module and housing may be substantially sealed so as to be substantially impervious to water, dirt, debris and the like, so that the module is well suited for the exterior application at the vehicle door handle. The outer wall or walls of the cover are substantially flush with the outer surface and contours of the strap portion of the door handle assembly, and may be colored so as to substantially match or contrast the color of the strap portion and/or the color of the vehicle door, depending on the particular application of the door handle assembly and illumination module.

Figure 3:
FIG. 3 is a perspective view of a door handle assembly and security beacon of the present invention.

The cover 26 of illumination module 16 may be at least partially or substantially translucent or transparent such that illumination emitted via the illumination source or illumination sources is transmitted through cover 26 for viewing by a person outside the vehicle. Optionally, and as shown in FIGS. 2 and 3, the cover and icon film of illumination module 16 may function to provide a security beacon or the like, so that a person viewing the door handle can recognize that a security system of the vehicle is activated or operational. For example, the illumination module or security beacon may flash red (or other desired or suitable color) to indicate operation of the security system of the vehicle.

Figure 4:
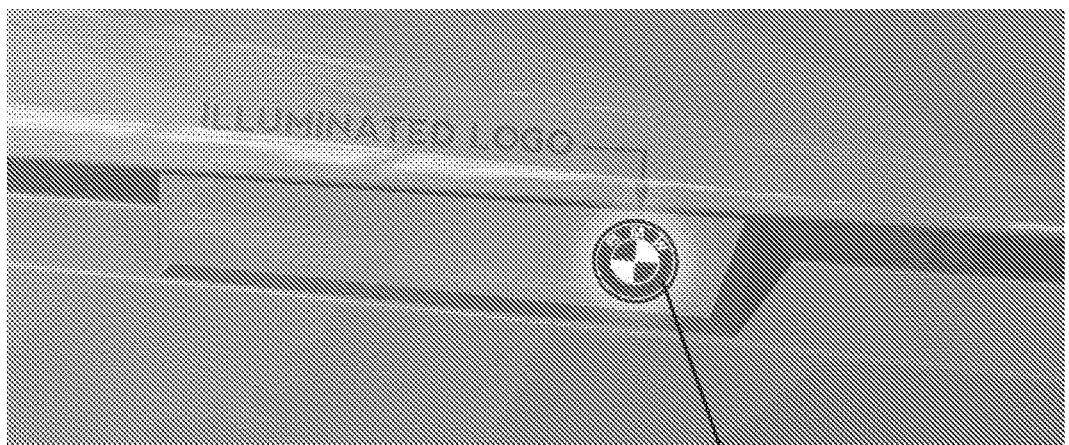
FIG. 4 is a perspective view of a door handle assembly and illuminated logo in accordance with the present invention.

Optionally, and as shown in FIG. 4, the illumination module 16' may provide a cover and icon film or template that provides a display of a vehicle logo or the like (or any other vehicle logo or brand name or custom display icon or the like). Thus, the illumination modules may provide a back lit icon or indicia or logo or emblem to provide enhanced ground illumination at the side of a vehicle. The icon or indicia or logo or emblem may comprise the vehicle manufacturer logo or the like, or may comprise a selected icon or indicia or logo, such as may be selected by the owner of the vehicle. For example, the owner of the vehicle may select a module having a desired icon or indicia or logo element or optic and the selected illumination module may be installed in the vehicle door handle and/or mirror assembly (or elsewhere on the vehicle, such as at or on or in the vehicle door or at or on or in a side panel of the vehicle or the like) to provide the customized or personalized ground illumination function. Such a selection and installation of the illumination module may be performed during manufacturing of the vehicle or as an aftermarket change to the vehicle. The icon illumination module thus may provide a personalized or customized illumination at the side of the vehicle, such as by utilizing aspects of the systems and assemblies described in U.S. Pat. Nos. 7,626,749; 7,255,451 and/or 7,289,037, which are hereby incorporated herein by reference in their entireties. Optionally, the illumination module may comprise a reconfigurable and/or programmable display to provide a security beacon feature and/or other display feature, such as a logo or icon or the like, at the exterior door handle of the vehicle. Optionally, the illumination module may be disposed elsewhere at the exterior of the vehicle, such as at an exterior rearview mirror assembly of the vehicle (such as at the housing of the mirror assembly or in the housing and behind the reflective element so as to be viewable through the reflective element) or the like. Optionally, an illumination module with a backlit icon of the types described above may be disposed at an interior portion of a vehicle, such as at an interior rearview mirror assembly (such as at a mirror casing or behind a reflective element and viewable through the reflective element or the like) of the vehicle or such as at or proximate to the interior door lock button or switch or the like. The illumination module thus may provide a security indicator function at the interior rearview mirror assembly or elsewhere in the interior cabin of the vehicle.

Optionally, and desirably, the cover and/or housing may be overmolded over the illumination source or sources and circuitry to provide a substantially sealed and substantially water impervious illumination module. For example, the housing may be overmolded over and around a metal stamping or stamped circuit element or plate with the illumination source or sources (such as LEDs or the like) fastened thereto or otherwise established thereon, or the housing may be overmolded over and around a printed circuit board or element with the illumination sources established thereon.

Thus, the illumination module of the present invention comprises a small illumination device or module that is disposed at a handle portion of a vehicle door handle assembly, and is operable to backlight an icon at the door handle. The illumination or backlighting intensity may be low enough to provide a glow at the logo or icon or beacon, yet high enough to be seen or discerned in high ambient or daytime lighting conditions. Optionally, the backlighting intensity may be controlled or adjusted or varied, such as in response to an ambient light sensor, so that the backlighting intensity is increased during daytime lighting conditions and decreased or activated at a reduced intensity during nighttime lighting conditions.

Thus, the present invention provides a security beacon at or in the door handle of the vehicle so that it is more visible to a person exterior of the vehicle. The security beacon of the present invention would be disposed at the door handle of both the driver side and passenger side of the vehicle (such as at the front driver side door and at the front passenger side door). Optionally, and in addition to the security beacon function or application, the illumination device or module of the present invention may be operable as an indicator to provide the driver with feedback as the driver or user or operator uses his or her key fob or as the passive or keyless entry system (PKE system) of the vehicle operates. Optionally, the illumination device or module may display vehicle logos or the like, and may use variable color LEDs that could be linked to an interior lighting system of the vehicle, such as to a MYCOLOR™ interior lighting system of the vehicle or the like.

Figure 5:
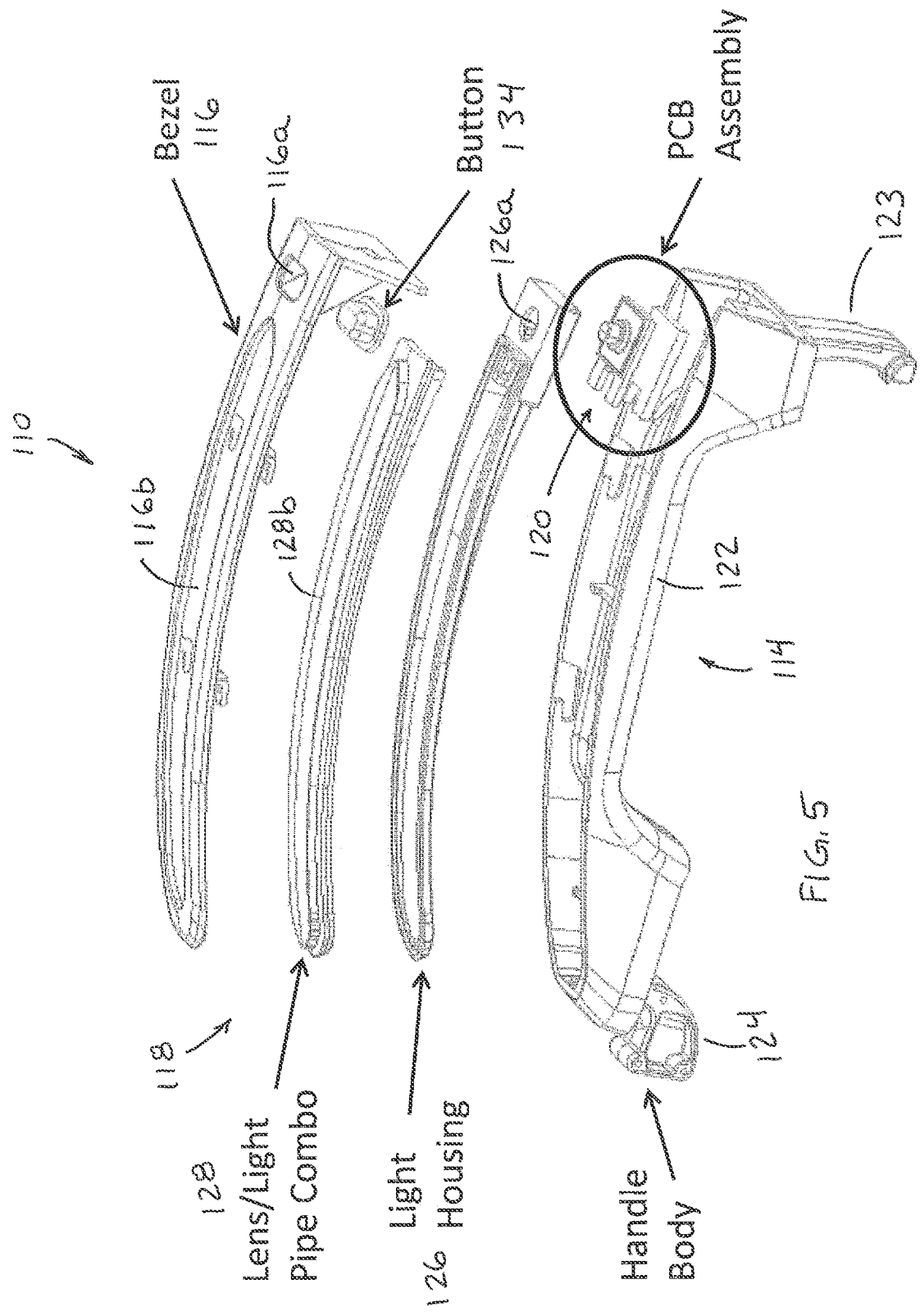
FIG. 5 is an exploded perspective view of a door handle assembly in accordance with the present invention.

Referring now to FIGS. 5-7, a vehicle door handle assembly 110 includes a base portion or cap portion that is mountable to a vehicle door and a handle or strap portion 114 that is pivotally mounted to the door or to a second or front base portion or bracket mounted to the door. Strap portion 114 is pivotable or movable or laterally movable relative to the door and the cap portion to move an actuating lever or member or arm or bell crank or the like at cap portion, which in turn moves a cable or rod or linkage or the like to actuate or release the latch mechanism of the door to open the vehicle door. Door handle assembly 110 includes a light strip or assembly 118 that is illuminated via at least one illumination source 120 at the handle portion 114 for providing illumination along the outer surface or bezel 116 of the handle assembly 110, as discussed below.

Door handle assembly 110 may comprise any suitable type of door handle assembly, and may include or incorporate aspects of the door handle assemblies described in U.S. Pat. Publication No. US 2006/0038418, published Feb. 23, 2006, which is hereby incorporated herein by reference in its entirety. Handle or strap portion 114 includes a grasping portion 122 for a user to grab and pull at to open the vehicle door. The handle portion 114 also includes opposite end portions 123, 124 at opposite ends of the grasping portion 122. End portion 123 attaches to the linkages of the door mechanism at the base portion of the door handle, while end portion 124 pivotally or movably or laterally movably attaches or mounts to the vehicle door or to a bracket or the like at the vehicle door, such as in a known manner and/or such as described in U.S. Pat. No. 7,407,203, and/or PCT Application No. PCT/US08/62347, filed May 2, 2008 and published Nov. 13, 2008 as International Publication No. WO 2008/137634, and/or U.S. patent application Ser. No. 12/499,183, filed Jul. 8, 2009 and published Jan. 14, 2010 as U.S. Publication No. US-2010-0007463; Ser. No. 12/499,183, filed Oct. 12, 2009 and published Apr. 15, 2010 as U.S. Publication No. US-2010-0088855; and/or Ser. No. 12/976,594, filed Dec. 22, 2010, now U.S. Pat. No. 8,786,401, which are hereby incorporated herein by reference in their entireties. Although shown as a strap type handle, the handle assembly may comprise any suitable type of vehicle door handle assembly, such as a paddle type vehicle door handle assembly (having a paddle or handle portion that is pivotable about a generally horizontal pivot axis to open the vehicle door, such as a handle assembly of the types described in U.S. Pat. Nos. 6,349,450; 6,550,103 and 6,907,643, which are hereby incorporated herein by reference in their entireties) or other type of vehicle door handle assembly, while remaining within the spirit and scope of the present invention.

As shown in FIG. 5, light strip or assembly 118 is disposed along an outer portion of the handle portion 114 and includes a light housing 126 and a lens and light pipe sub-assembly or combination 128, which are received between strap portion 114 and bezel portion 116. The illumination source 120 is disposed at an end of the light strip 118 and is operable to emit light into the light housing 126 and along the light pipe 128 to provide substantially uniform lighting along the light strip 118 at and along the outer surface of the door handle. The light pipe may comprise any suitable light pipe, such as a flexible light pipe that may flex to conform to the contours of the door handle and thus provide a substantially uniform lighting along the exterior surface of the door handle.

As best shown in FIG. 6, illumination source 120 comprises a light emitting diode 121 (or other suitable light source) that is disposed at a circuit element or printed circuit board 130 and that is actuatable via an electrical switch or button 132 at circuit element 130. As shown in FIG. 5, switch 132 is received or disposed at a button element 134 (such as a flexible or movable element) that is at least partially received through an opening 116a at the bezel portion 116 so as to be accessible and actuatable by a user outside of the vehicle. Thus, when a person grasps handle portion 114, such as to open the vehicle door, the person may depress or actuate button 134, which in turn actuates switch 132, which may unlock or lock the vehicle door (and optionally may energize or actuate light emitting diode 121 to illuminate the outer surface region of the door handle).

In the illustrated embodiment, light emitting diode 121 is sidewardly mounted at circuit element 130 at a generally U-shaped portion of the circuit element, where two prongs or legs 130a protrude from a base or generally square-shaped portion 130b at which the switch circuitry is established. The illumination source 120 is partially received at an end of the light housing, with switch 132 protruding through an aperture 126a in light housing 126 that is generally aligned with aperture 116a of bezel 116. The prongs or legs 130a of circuit element 130 are received in correspondingly formed receptacles or attachment portions of light housing 126 and light pipe 128 is partially received in light housing 126 (and the circuit element 130 may be retained therein via a potting material or compound 131 or the like), such that, when assembled, light emanating from light emitting diode 121 is received at an end region or opening 128a (FIG. 6) of light pipe 128 and is transmitted along light pipe 128. An outer surface or portion or cover or lens 128b of light pipe 128 is received at or at least partially through a slot or aperture 116b of bezel portion 116, and outer surface or portion 128b of light pipe 128 may be translucent or transparent (and may comprise a diffusing material or the like or may comprise one or more backlit icons or indicia or logo or the like) so that light emitted by light emitting diode 121 is guided along light pipe 128 and emanates or transmits through cover or outer portion 128b of light pipe 128 at bezel portion 116.

Optionally, the light strip may be disposed behind a transparent or semi-transparent or colored or metallic colored and partially light transmitting panel or layer or cover or element, such that the light strip may be viewable when activated, but substantially not viewable or discernible behind the panel or layer or element when not activated. The partially light transmitting cover or panel or layer or element may be partially reflective or opaque or colored so as to provide an enhanced appearance to the door handle, where the illumination module or light strip is substantially hidden within the door handle and is viewable and discernible when activated or powered. The partially light transmitting cover or panel or layer or element may comprise a generally transparent or translucent element with a partially transmitting and partially opaque or reflective coating thereon or the element may be formed or dyed or colored with a material that allows for partial transmission of light therethrough and yet providing an opaque or reflective appearance at the door handle when the light strip is deactivated. Optionally, the cover material may utilize aspects of the door handles described in and/or PCT Application No. PCT/US08/62347, filed May 2, 2008 and published Nov. 13, 2008 as International Publication No. WO 2008/137634, which is hereby incorporated herein by reference in its entirety. Optionally, the cover material or coating may be selected to allow for transmission of light emitted by the light strip while substantially attenuating or reflecting light having other wavelengths, such as by utilizing aspects of the transflective mirror substrates described in U.S. Pat. No. 7,274,501, which is hereby incorporated herein by reference in its entirety.

Optionally, the door handle assembly may include a capacitive sensor or other sensor or sensing device for sensing the presence of a person at the door handle, so that the light strip may be activated or illuminated in response to a detected presence (such as in response to a detection of a person's hand at or near the door handle). Optionally, the sensor may detect the presence of a person and may recognize an authorized user or driver of the vehicle and the door may be automatically unlocked in response to such a detection.

When utilizing a light bar or strip at or on the surface of a door handle, the location of the light strip is at or on the Class A surface of the door handle and the person's hand may partially cover the light source during entry. However, the light strip may be activated and illumination provided as the person approaches the vehicle and before grasping the door handle so that the benefits of the illumination at the door handle are achieved before the person grasps the door handle to open the vehicle door. The illumination module or device may be activated by a passive entry system or tied into the vehicle's electrical structure to activate the illumination module of the door handle. Optionally, the light bar or strip may be provided in various colors that may be selected for the particular application and may be coupled with other exterior lighting schemes or trim color schemes to maintain a consistent lighting/trim theme for the vehicle.

Thus, the door handle of the present invention provides a generally or substantially uniform lighting pattern or glow along the handle portion of the vehicle door handle. The light source may be actuatable by a user depressing or touching (for applications where the door handle or button may be touch sensitive or proximity sensitive) the door handle, and/or the light source may be actuatable responsive to any other suitable input or signal, such as in response to at least one of a touch of the door handle, a movement of the strap or handle portion, actuation of a remote keyless entry module, or passive entry device, a motion detection at the vehicle, and an insertion of a key into a keyhole at the door handle. Preferably, the illumination source is deactuatable following a period of time after actuation of the illumination source. Optionally, the light module and/or illumination source may have a dimming control feature or function, such that the illumination source, when activated, is ramped up or progressively powered up to its full illumination state, and when deactivated, is ramped down or dimmed or progressively powered down to its deactivated state. The light module or device of the present invention utilizes an elongated light pipe that is disposed along the handle and that uses a single light emitting diode (or other suitable light source) to achieve substantially uniform lighting or illumination or backlighting along the exterior surface of the door handle and in a substantially small or tight packaging space.

The illumination module may provide a common circuit element or circuit board for providing the lighting feature (such as responsive to a touch or proximity at the door handle and/or to a passive entry system or key fob signal or the like) and for providing a door unlocking feature via the button and associated circuitry of the module. The door thus may be unlocked responsive to a passive entry system or key fob signal or optionally a touch or proximity sensor at the door handle (in conjunction with a recognition by a passive entry system that the user is authorized to unlock and enter the vehicle), and may be locked via a user pressing the button at the door handle, whereby the circuitry of the module may lock the vehicle door (and may illuminate or energize the light emitting diode to illuminate the door handle and confirm to the user that the door is locked).

The illumination source may comprise any suitable illumination source, such as a light emitting diode (LED), such as a white LED or high intensity power LED (such as the types described in U.S. Pat. Nos. 7,195,381 and/or 6,690,268, which are hereby incorporated herein by reference in their entireties) or organic light emitting diode (OLED) or electroluminescent light source or the like. The illumination source may comprise a substantially white light emitting illumination source, or may comprise a colored light emitting illumination source (or a white light emitting illumination source may emit light that passes through a color filter or the like) to provide color illumination (such as blue or other color as desired) at and along the door handle depending on the particular application of the door handle assembly and illumination module. For example, the illumination module may emit or transmit colored light that may match or correspond to the interior and/or exterior lighting of the particular vehicle to which the door handle assembly is mounted.

Optionally, other lighting means may be implemented to provide substantially uniform lighting or backlighting or glow along an outer surface of the door handle. For example, and with reference to FIGS. 8 and 9, a light module or light strip 218 may comprise a base portion or circuit element or circuit board 230 that has a plurality of side emitting light emitting diodes 221 (or other suitable light source or sources) disposed or established thereat and spaced apart along opposite side regions of the circuit board 230. A cover or housing 226 is disposed over the circuit board 230 and may at least partially receive the circuit board 230 and light emitting diodes 221 therein. For example, and as can be seen in FIG. 8, the light emitting diodes 221 may be received in a cavity or chamber 226a of cover 226. The cover 226 includes a clear lens strip 228 disposed or established along the cover, such that, when the light emitting diodes 221 are activated or energized, light emanating from the light emitting diodes passes or transmits through the lens strip 228 (which may be partially or substantially translucent or clear and/or may include or comprise a diffusing material or the like) so as to provide illumination along the outer surface of the door handle, such as in a similar manner as described above. The light strip 218 may be mounted or received within and along the handle portion of the door handle assembly, such as via a potting material or compound 231 or the like disposed along the circuit element or board 230. An electrical connector 230a may be established at circuit board 230 and may protrude therefrom and through an aperture 231a of potting compound 231 for electrical connection to a vehicle power source or control circuitry or the like, such as control circuitry of the door handle assembly and/or of the vehicle.

Figure 11:
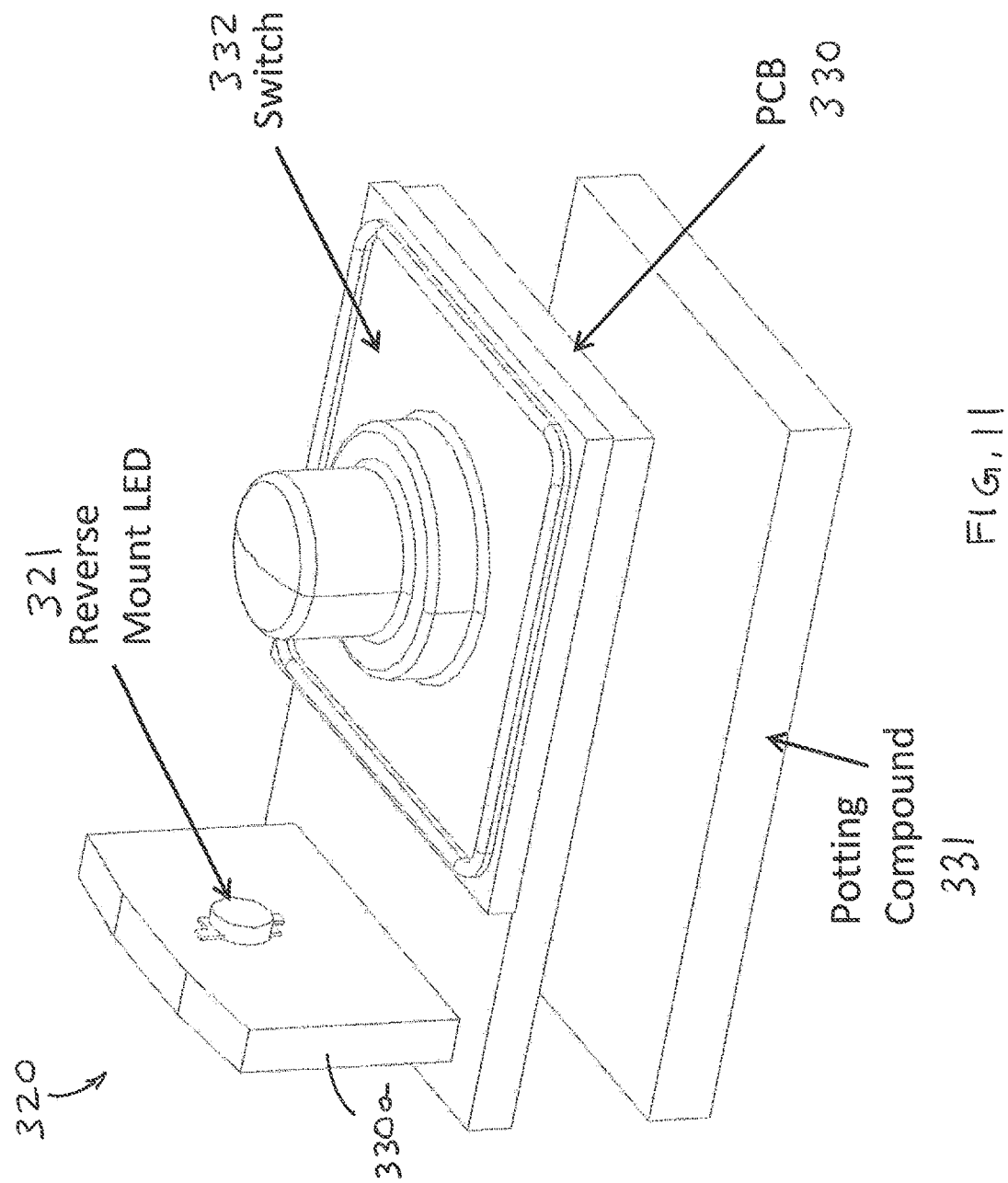
FIG. 11 is a perspective view of a light module of the door handle assembly of FIG. 10.

Optionally, and with reference to FIGS. 10 and 11, a vehicle door handle assembly 310 includes a base portion or cap portion that is mountable to a vehicle door and a handle or strap portion 314 that is pivotally mounted to the door or to a second or front base portion or bracket mounted to the door. Door handle assembly 310 includes a light strip or assembly 318 that is illuminated via at least one illumination source 320 at the handle portion 314 for providing illumination along the outer surface or bezel 316 of the handle assembly 310, such as in a similar manner as discussed above with respect to door handle assembly 110.

In the illustrated embodiment, light strip or assembly 318 is disposed along an outer portion of the handle portion 314 and includes a light housing 326, a light pipe 327 (such as a flexible light pipe or element) and a lens 328, which are received or disposed between strap portion 314 and bezel portion 316. The illumination source 320 is disposed at an end of the light strip 318 and is operable to emit light into the light housing 326 and along the light pipe 327 to provide substantially uniform lighting along the light strip 318 at and along the outer surface of the door handle.

As best shown in FIG. 11, illumination source 320 comprises a light emitting diode 321 (or other suitable light source) that is disposed at a circuit element or printed circuit board 330 and that may be actuatable responsive to a signal or input (such as responsive to a passive entry system or key fob signal or the like), or that may be actuatable responsive to a user input, such as a user actuating the electrical switch or button 332 at circuit element 330 (with the button and switch also being operable to actuate/deactuate other features of the door handle or door or vehicle, such as for locking/unlocking the vehicle door or the like). In the illustrated embodiment, light emitting diode 321 comprises a reverse mounted light emitting diode that is established at a circuit element 330a that protrudes from and may be generally normal to circuit element 330. As shown in FIG. 10, switch 332 is received or disposed at a button element 334 (such as a flexible or movable element) that is at least partially received through an opening 316a at the bezel portion 316 so as to be accessible and actuatable by a user outside of the vehicle. Thus, when a person grasps handle portion 314, such as to open the vehicle door, the person may depress or actuate button 334, which in turn actuates switch 332, which may lock or unlock the vehicle door and which optionally may energize or actuate light emitting diode 321 to illuminate the outer surface region of the door handle.

The illumination source 320 is partially received at an end of the light housing, with switch 332 protruding through an aperture 326a in light housing 326 that is generally aligned with aperture 316a of bezel 316. The circuit element 330 is received in a correspondingly formed receptacle or attachment portion 326b of light housing 326 and light pipe 327 is partially received in light housing 326 (and the circuit element 330 may be retained therein via a potting material or compound 331 or the like), such that, when assembled, light emanating from light emitting diode 321 is received at an end region or opening 327a of light pipe 327 and is transmitted along light pipe 327. An outer surface or portion or cover or lens 328a of cover 328 is received at or at least partially through a slot or aperture 316b of bezel portion 316, and outer surface or portion 328a of cover 328 may be translucent or transparent (and may comprise a diffusing material or the like or may comprise one or more backlit icons or indicia or logo or the like) so that light emitted by light emitting diode 321 is guided along light pipe 327 and emanates or transmits through cover or outer surface or lens 328a of cover 328 at bezel portion 316.

Figure 12:
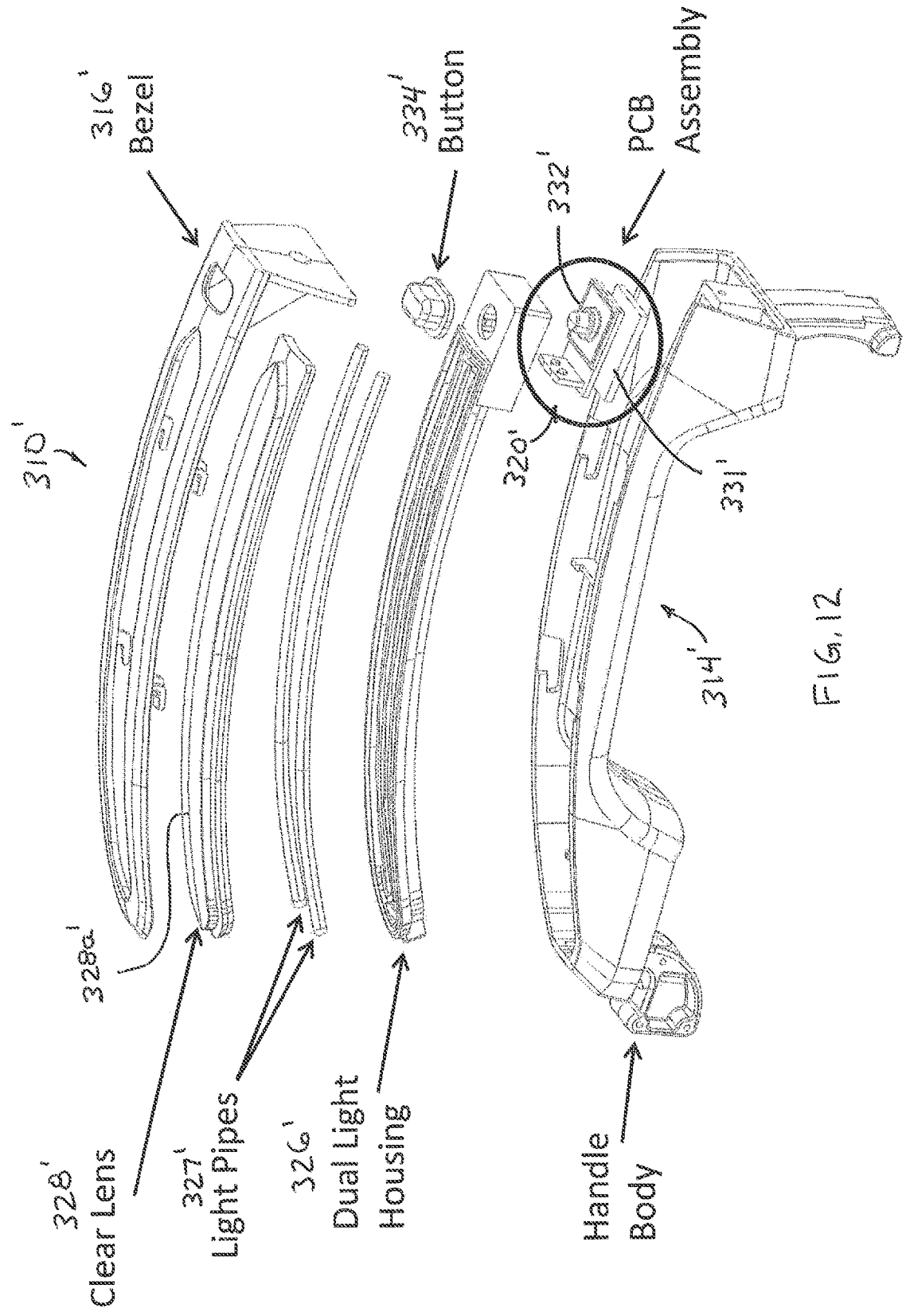
FIG. 12 is an exploded perspective view of another door handle assembly in accordance with the present invention.
Figure 13:
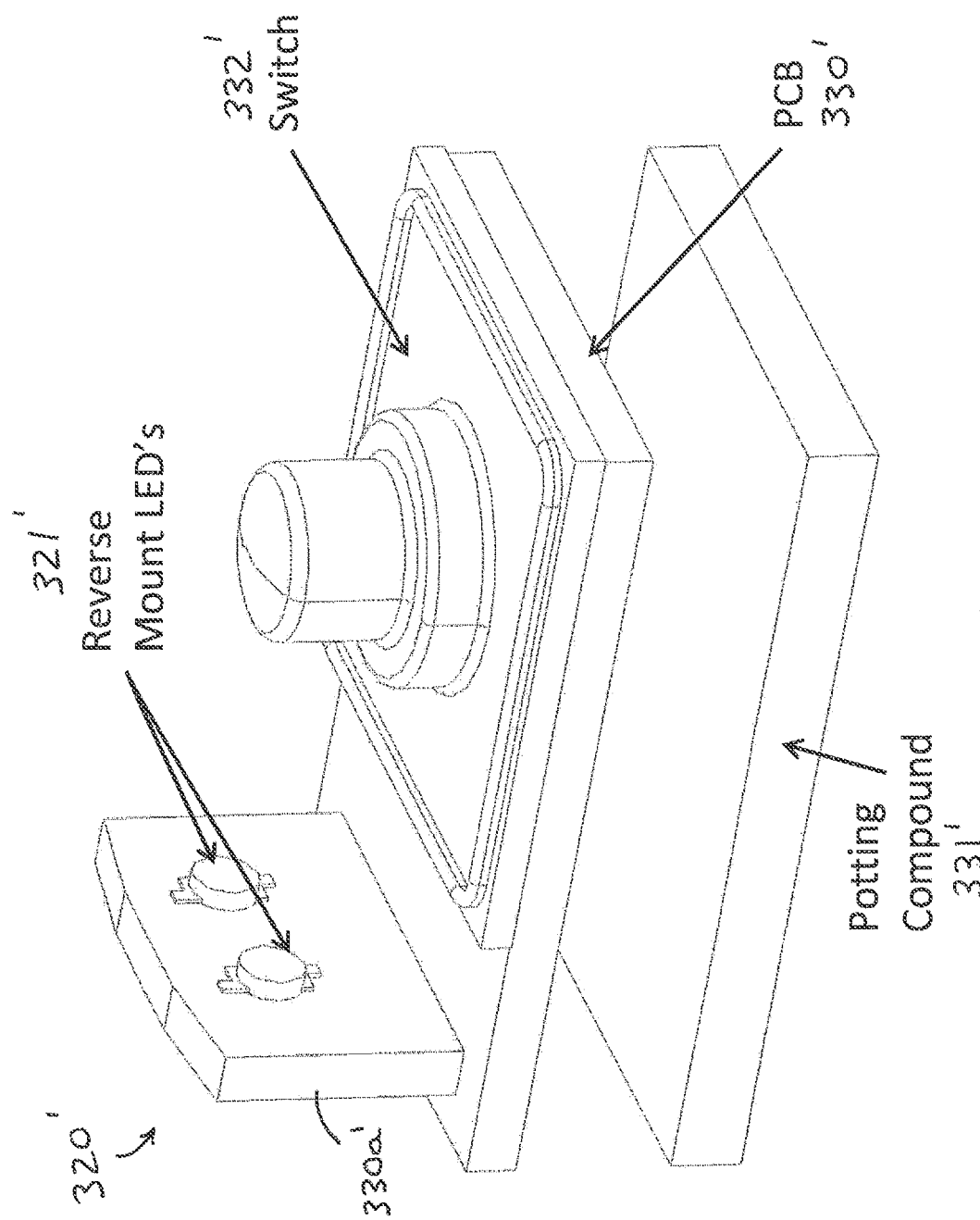
FIG. 13 is a perspective view of a light module of the door handle assembly of FIG. 12.

Optionally, and with reference to FIGS. 12 and 13, a vehicle door handle assembly 310' may be substantially similar to vehicle door handle assembly 310, discussed above, but includes a dual light pipe construction having two light pipes 327', each illuminated by a respective light emitting diode 321'. The light pipes 327' are received in a dual light housing 326' (which is received at handle portion 314') and receive light emitted by light emitting diodes 321' of the illumination source 320'. A cover or lens 328' is disposed at housing 326', with an outer surface of lens 328a' exposed at the bezel portion 316', such as in a similar manner as discussed above with respect to door handle assembly 310. Door handle assembly 310' may otherwise be substantially similar to door handle assembly 310, discussed above, such that a detailed discussion of the door handle assemblies need not be repeated herein. The similar components are referenced in FIGS. 12 and 13 with similar reference numbers as used to reference the components of the door handle assembly 310 of FIGS. 10 and 11.

Figure 14:
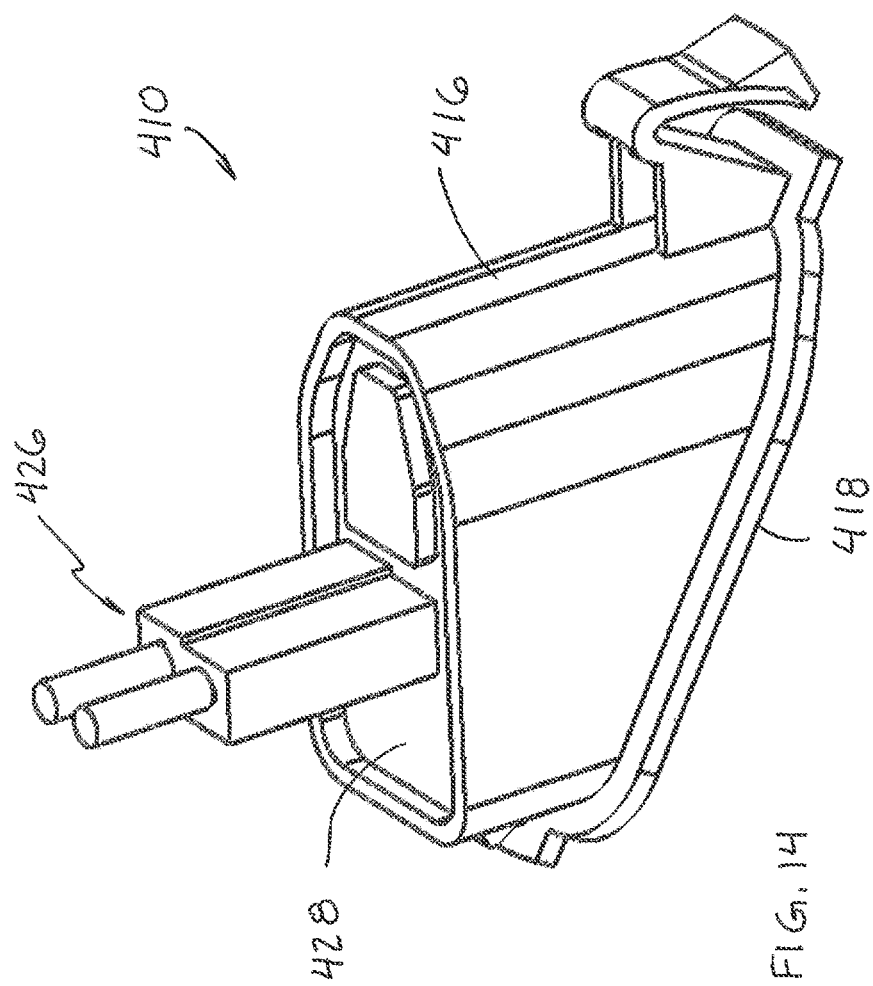
FIG. 14 is a perspective view of a ground illumination and projection light module in accordance with the present invention.
Figure 15:
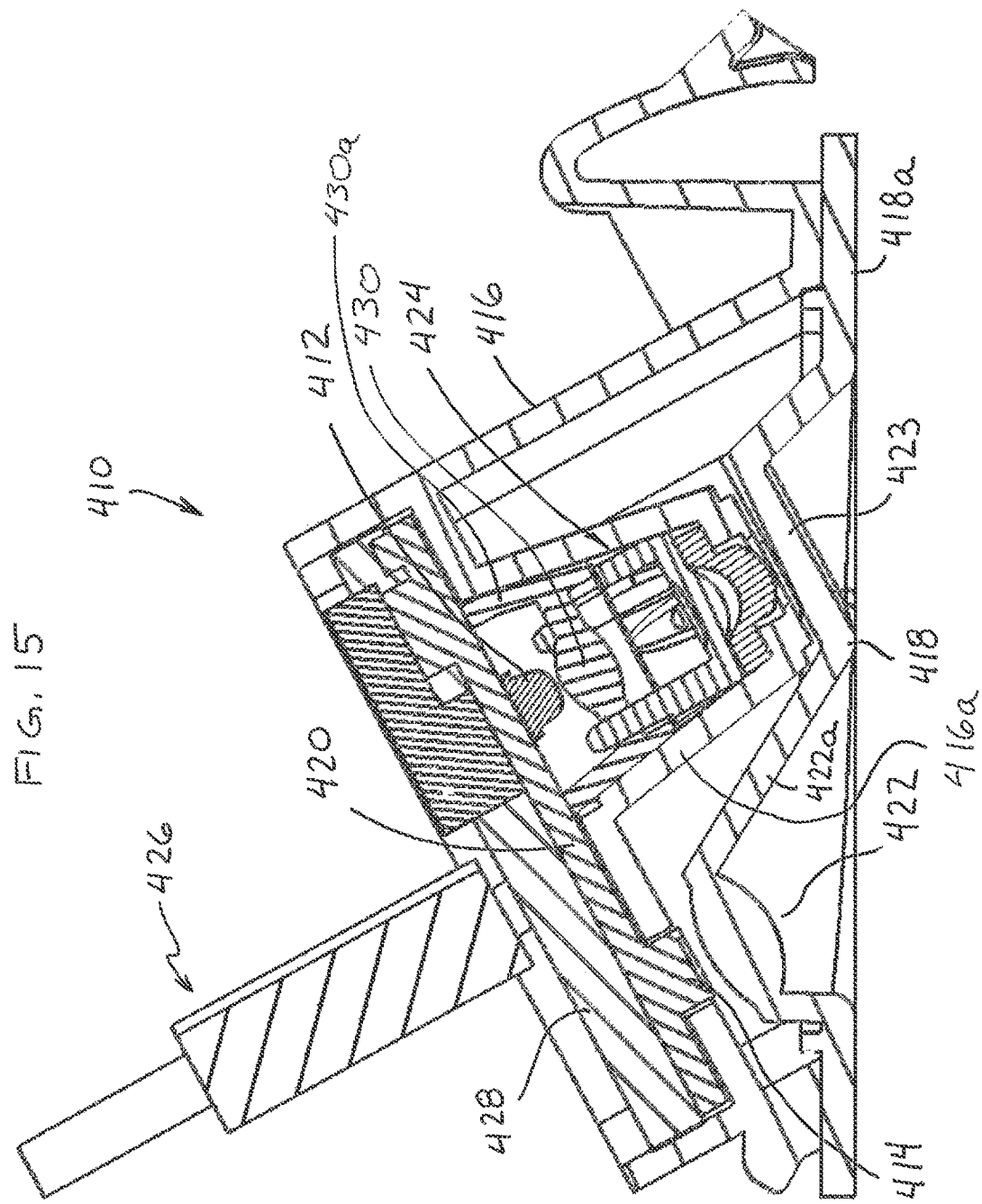
FIG. 15 is a sectional view of the ground illumination and projection light module of FIG. 14.

Optionally, and with reference to FIGS. 14 and 15, an illumination module 410 may be disposed at a vehicle door handle or at an exterior rearview mirror assembly or the like at a side and exterior portion of a vehicle, with the illumination module 410 providing (a) projection or backlighting of an image using a backlighting or projecting light source 412 (such as a light emitting diode or electroluminescent light source or the like) and (b) ground illumination using a single or multiple ground illuminating light source 414 (such as one or more light emitting diodes or electroluminescent light sources or the like). Illumination module 410 includes a housing or casing 416 that is configured to be received (and optionally snapped or otherwise secured) at or in an opening of the door handle or mirror assembly, with a flange portion 418a of an outer portion or cover 418 of housing 416 being at or generally flush with the outer surface of the door handle or mirror at which the illumination module is mounted.

As shown in FIG. 15, illumination module 410 includes a circuit element 420 (such as a printed circuit board or the like) with at least one projecting or backlighting light emitting diode 412 established thereat and at least one ground illuminating light emitting diode 414 established thereat. In the illustrated embodiment, the circuit element 420 is supported at housing 416 so that the circuit element is angled relative to the outer cover 418 of the module. The angle of the circuit element may be selected depending on the particular application of the illumination module, and may result in light emanating from either or both of the illumination sources being directed generally downward and partially away from the side of the vehicle at which the illumination module is disposed.

Ground illuminating light emitting diode 414 is disposed behind a light reflecting/light directing structure or lens 422 (that may be part of cover 418) that is configured to direct or guide or reflect light emanating from ground illumination light emitting diode 414 generally downwardly and to the right in FIG. 15. Thus, when illumination module 410 is mounted at a side of a vehicle, light emanating from ground illuminating light emitting diode 414 (when ground illuminating light emitting diode 414 is powered) is directed generally downwardly and rearwardly and/or away from the vehicle to illuminate the ground area adjacent the side of the vehicle.

Projecting light emitting diode 412 is also disposed at circuit element 420 and is disposed behind a lens assembly 424 that guides and directs and focuses light emanating from projecting light emitting diode 412 (when projecting light emitting diode 412 is powered) generally downwardly and rearwardly and/or away from the vehicle to project the desired light or color or image at the side of the vehicle. Optionally, the lens assembly 424 may include an icon element or template or the like so that, when projecting light emitting diode 412 is powered, light emanating from projecting light emitting diode 412 backlights an icon (or indicia or logo or the like) established at the icon element so that an image of the icon is viewable at illumination module and/or is projected by illumination module and onto the ground area adjacent the vehicle (or elsewhere at or near the side of the vehicle depending on the lens assembly and angle of the circuit element and lens assembly).

Optionally, and as shown in FIG. 15, the light emanating from the projecting light emitting diode 412 may first pass through a condenser or optic element or lens 430, which directs the light toward and through the lens assembly 424, and which may have opaque or non-light-transmitting side walls 430a (and/or a lens holding portion 416a of housing 416 may comprise opaque or non-light-transmitting side walls) to limit light emanating into the housing and into the ground illumination portion of the light module. Optionally, the side walls 430a of the optic element 430 (and/or the side walls of the lens holding portion of the housing) may have a reflective coating or layer so as to reflect the light within the optic element or lens holding portion inward to enhance the intensity of light passing through the optic element and lens assembly for projecting an iconistic or icon image onto the ground at or near the side of the vehicle. The condenser or optic element 430 may comprise any suitable material, and may comprise a molded polycarbonate or plastic element or the like.

The cover 418 of illumination module 410 may be at least partially or substantially translucent or transparent at least at the illumination sources such that illumination emitted via the illumination sources is transmitted through the cover at the illumination regions and toward the vehicle side or door or ground area. The illumination regions may have a lens or aperture thereat to direct the light in the desired direction and in the desired manner. Optionally, the illumination regions of the cover may provide a diffusing optic or diffusing effect or frosting to diffuse or spread out the emitted light to provide substantially uniform illumination and to limit or substantially preclude bright spots at the vehicle side or door when the illumination source is activated.

As shown in FIG. 15, illumination module 410 comprises a unitary module that may be plugged in or installed or attached at an opening at a vehicle (such as an opening at a door handle or exterior rearview mirror or trim element or the like) and may comprise a substantially water impervious sealed module (optionally, with outer cover 418 comprising a unitary construction and including lens 422 and an outer portion 423 at projecting lens assembly 424 (and optionally with the cover 418 comprising a transparent cover with a light directing portion 422a optionally having a reflective coating or the like established thereat). An electrical lead 426 (such as a pair of wires or the like) is electrically connected to circuitry at the circuit element or board 420 and may include one or more terminals extending through and from a rear portion or wall 428 of the casing or housing 416 for electrically connecting the illumination module to a power source and/or control of the vehicle and/or door and/or exterior rearview mirror assembly and/or the like.

Therefore, the illumination module 410 provides a dual function and is operable to provide a light projection function (such as projection of non-white light, such as a selected color or such as a variable color or the like to optionally coordinate with an interior color scheme of the vehicle or the like) with one (or more) light emitting diode (or other suitable light source) and a ground illumination function (such as via one or more white light-emitting light emitting diodes or other suitable light source). The illumination module comprises a self-contained unitary sealed module with two light emitting diodes and any suitable lens/light guiding element to provide the desired illumination effect with each of the illumination sources.

The illumination module thus may comprise a small, self-contained module that includes a housing that substantially encases the illumination sources and circuitry of the illumination module. The housing and/or cover attached thereto includes an outer wall that substantially corresponds to the contours of the door handle assembly or mirror assembly at the illumination module such that the outer vehicle surface has a substantially continuous outer surface or wall at the illumination module. The module and housing may be substantially sealed so as to be substantially impervious to water, dirt, debris and the like, so that the module is well suited for the exterior application at the vehicle door handle.

Optionally, the illumination module may include a single illumination source, such as a single light emitting diode, such that the illumination module is operable to provide both ground illumination and light projection with a single or common illumination source of light emitting diode. For example, and with reference to FIGS. 16-18, an illumination module 510 includes a circuit element 520 (such as a printed circuit board or the like) with a single or common projecting and backlighting and ground illuminating illumination source 512 (such as a single light emitting diode or the like) established thereat. In the illustrated embodiment, the circuit element 520 is supported at housing 516 so that the circuit element is angled relative to the portion 518a of the outer cover 518 of the module that is generally coplanar with the lower surface of the mirror casing or door handle or vehicle portion at which the illumination module is mounted. The angle of the circuit element may be selected depending on the particular application of the illumination module, and may result in light emanating from the illumination source being directed generally downward and partially away from the side of the vehicle at which the illumination module is disposed.

Figure 18:
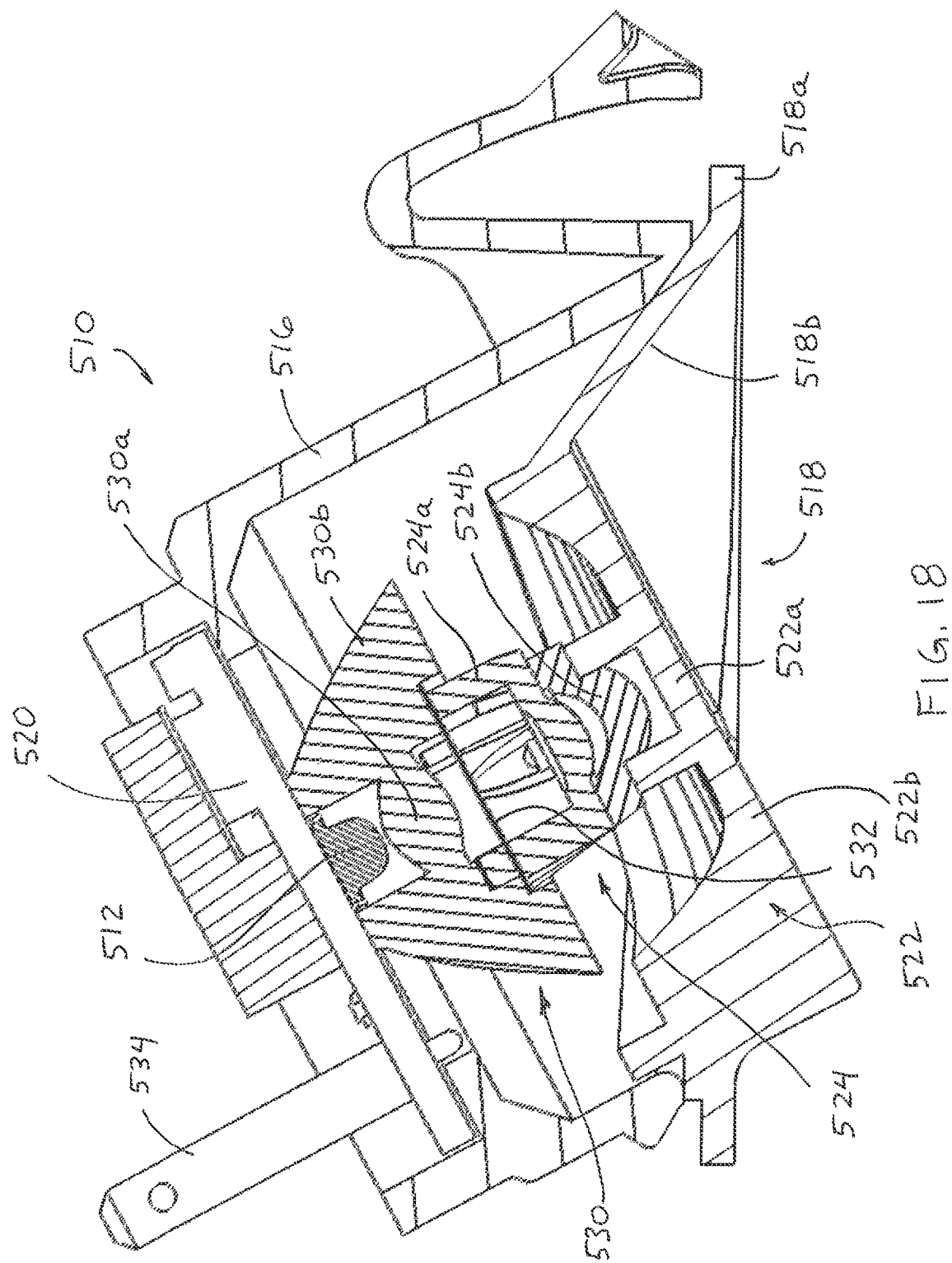
FIG. 18 is a sectional view of the ground illumination and projection light module of FIG. 16.

As shown in FIGS. 17 and 18, illumination module 510 includes a condenser or optic element 530 disposed at the circuit element 520 so that a passageway of the condenser 530 is generally at the illumination source 512, and with a mask or masking element 532 disposed at the opposite end region of the condenser from the illumination source. A projecting lens assembly 524 is disposed at the condenser 530 and comprises a first projection lens 524a and a second projection lens 524b disposed at the condenser and along an optical path between the light emitting diode 512 and the cover 518. The cover 518 is attached at the outer end region of the housing 516 distal from the circuit element 520, and includes a ground illumination lens 522.

As shown in FIG. 18, the condenser 530 includes a central condensing lens portion 530a that focuses or intensifies the light emanating from the light emitting diode 512 and directs that light to and through the masking element 532 and the projecting lenses 524a, 524b to provide the projecting function. The lens 522 at cover 518 includes a generally central projecting portion 522a that is disposed at projecting lens 524b, such that the light projected by lens assembly 524 passes through projecting portion 522a to project the icon or image (established at masking element 532) onto the ground at or near the vehicle.

The condenser or optic element 530 also includes an outer portion 530b that more broadly or diffusely directs or guides or reflects light emanating from the light emitting diode 512 around (and not through) the masking element 532 and projecting lenses 524a, 524b, whereby the light that passes through outer portion 530b of condenser 530 is directed or guided or reflected to and through the ground illumination lens portion 522b of lens 522 at cover 518. The condenser may have refractive properties to provide redirection or guiding of the light toward the ground illumination lens portion 522b of the cover. The condenser or optic element 530 may comprise any suitable material, and may comprise a molded polycarbonate or plastic element or the like. Optionally, the outer surface of the outer portion 530b of condenser 530 (and optionally the inner surface of the condenser as well) may have a reflective coating or layer to reflect light in the desired direction towards the lens portion 522b of lens 522 at cover 518 to enhance the intensity of light passing through the condenser and lens portion 522b for illuminating the ground at or near the side of the vehicle. Optionally, the illumination source or light emitting diode may comprise a 90 degree light emitting diode (having an angled or 90 degree light pattern) or the like such that a substantial amount of light is directed or emitted at least partially towards the side walls of the condenser to enhance the amount of light that passes through and along the condenser towards the ground illumination lens portion 522 at cover 518 (while still providing sufficient light for passing through central portion 530a of condenser for providing the projecting illumination at the ground area at or near the side of the vehicle).

As shown in FIG. 17, the ground illumination lens portion 522b is formed to receive light from the outer portion 530b of condenser 530 and to broadly direct or diffusely direct or reflect the light toward the ground area at or near the side of the vehicle at which the illumination module is disposed. The shape or configuration of the ground illumination lens portion 522b is selected or established to provide the desired ground illumination effect (such as a desired size and/or shape of the ground illumination area or zone at the side of the vehicle when the light module is activated). Although shown as having the ground illumination lens portion spaced from the condenser, it is envisioned that the light module may have an optical path around the projection lens assembly that comprises a light pipe or other light guiding element to enhance passage of light from the outer portion of the condenser to the ground illumination lens portion to provide enhanced ground illumination at the side of the vehicle. The light module may include opaque or non-light-transmitting separating walls between the projecting lens assembly and the ground illumination light pipe or the like to provide the desired or appropriate light control or guiding of the light emanating from the single or common light emitting diode.

As shown in FIGS. 16 and 18, illumination module 510 comprises a unitary module that may be plugged in or installed or attached at an opening at a vehicle (such as an opening at a door handle or exterior rearview mirror or trim element or the like) and may comprise a substantially water impervious sealed module (optionally, with outer cover 518 comprising a unitary construction and including lens 522 (and with the cover 518 comprising a transparent cover with a light directing or guiding or reflecting portion 518b optionally having a reflective coating or the like established thereat). An electrical lead (such as a pair of wires or the like) is electrically connected to circuitry at the circuit element or board 520 and may include one or more terminals 534 extending through and from circuit element 520 and/or a rear portion or wall of the casing or housing of the module for electrically connecting the illumination module to a power source and/or control of the vehicle and/or door and/or exterior rearview mirror assembly and/or the like.

The condenser 530 and light emitting diode 512 are disposed behind the light reflecting/light directing structure or lens 522b (that may be part of cover 518) that is configured to direct or guide or reflect light emanating from light emitting diode 512 generally downwardly and to the right in FIG. 18. Thus, when illumination module 510 is mounted at a side of a vehicle, some of the light emanating from light emitting diode 512 (when light emitting diode 512 is powered) passes through the side portion of the condenser and through lens 522b and is directed generally downwardly and rearwardly and/or away from the vehicle to illuminate the ground area adjacent the side of the vehicle.

Also, the light emitting diode 512 is disposed behind the central portion of the condenser 530 and the lens assembly 524, which function to guide and direct and focus some of the light emanating from light emitting diode 512 (when light emitting diode 512 is powered) through the masking element and generally downwardly and rearwardly and/or away from the vehicle to project the desired light or color or image or icon at the side of the vehicle. The lens assembly 524 includes or is disposed at the iconistic element or icon element or template or masking element 532 or the like so that, when light emitting diode 512 is powered, light emanating from light emitting diode 512 backlights or passes through an icon (or indicia or logo or the like) established at the icon element 532 so that an image of the icon is viewable at illumination module and/or is projected by illumination module and onto the ground area adjacent the vehicle (or elsewhere at or near the side of the vehicle depending on the lens assembly and angle of the circuit element and lens assembly).

Figures 19, 20:
FIG. 19 is a perspective view showing projection lighting provided by a projection lighting device at the side of a vehicle.
FIG. 20 is a perspective view showing projection and ground illumination lighting provided by the ground illumination and projection light module of the present invention when disposed at the side of a vehicle.

Optionally, the masking element may comprise a clear plastic or glass element with an icon established thereat (such as by providing the icon or form at clear portions of the masking element, with the surrounding portions of the masking element being darkened or less clear or having reduced light transmissivity). The projected image thus may be a white light icon that is generally a brighter white than the surrounding ground illuminator light (such as shown in FIG. 20). Optionally, in order to have enhanced contrast between the iconistic/icon projection and the ground illumination at the ground area when the light module is activated, the masking element may comprise a colored mask for the projected image, such that the projected image or icon is colored (such as red and/or blue and/or any other desired or selected color), while the ground illumination surrounding the projected image or icon is white (or other selected color, as may be determined by coloring the ground illumination lens and/or the condenser and/or the light emitting diode and/or providing a variable colored light emitting diode or the like). Thus, the light module may provide the desired ground illumination and icon projection, and may do so with the projected icon and/or the surrounding ground illumination being a selected color and with a desired contrast between the projected icon and the surrounding ground illumination.

The cover 518 of illumination module 510 may be at least partially or substantially translucent or transparent at least at the illumination source such that illumination emitted via the illumination source is transmitted through the cover at the illumination regions and toward the vehicle side or door or ground area. The illumination regions may have a lens or aperture thereat to direct the light in the desired direction and in the desired manner. Optionally, the illumination regions of the cover may provide a diffusing optic or diffusing effect or frosting to diffuse or spread out the emitted light to provide substantially uniform illumination and to limit or substantially preclude bright spots at the vehicle side or door when the illumination source is activated.

Therefore, the illumination module 510 provides a dual function and is operable to provide a light projection function (such as projection of non-white light, such as a selected color or such as a variable color or the like to optionally coordinate with an interior color scheme of the vehicle or the like) with a single light emitting diode (or other suitable light source) and a ground illumination function (such as via one or more white light-emitting light emitting diodes or other suitable light source) via the same or common light emitting diode (or via a common set of light emitting diodes, such as two or more light emitting diodes that operate together to provide both the ground illumination and icon projection features). The illumination module comprises a self-contained unitary sealed module with a light emitting diode and any suitable lens/light guiding element to provide the desired illumination effect with the common illumination source.

The illumination module thus may comprise a small, self-contained module that includes a housing that substantially encases the illumination sources and circuitry of the illumination module. The housing and/or cover attached thereto includes an outer wall that substantially corresponds to the contours of the door handle assembly or mirror assembly at the illumination module such that the outer vehicle surface has a substantially continuous outer surface or wall at the illumination module. The module and housing may be substantially sealed so as to be substantially impervious to water, dirt, debris and the like, so that the module is well suited for the exterior application at the vehicle door handle.

Thus, the light module 510 provides the function of ground illumination and projection light by the use of a single or common light emitting diode. Typically, projection lights provide a very narrow beam of light. When projected on the ground, the "illumination circle" is about 300-500 mm (such as shown, for example, in FIG. 19). The light module of the present invention provides such illumination capability and also provides ground illumination of at least approximately 2 lux, and preferably at least approximately 4 lux, over about a 600 mm by 1200 mm generally rectangular-shaped (or other shape) ground illumination area or zone, while providing a focused projection of the icon or image within the ground illumination zone (such as shown, for example, in FIG. 20). Thus, the present invention provides both a projection light and a ground illumination light with a single light module and with a single or common illumination or light source.

Although shown and described as being disposed at an exterior rearview mirror assembly and/or door handle and/or exterior portion of a vehicle for providing illumination at a side of a vehicle, it is envisioned that the light module of the present invention is suitable for other applications. For example, a light module of the present invention may be disposed at an interior portion of a vehicle, such as at an interior rearview mirror assembly (such as at a mirror casing or behind a reflective element and viewable through the reflective element or the like) of the vehicle or the like, whereby actuation of the light module may provide broad illumination of the dashboard and/or instrument panel of the vehicle (generally beneath the mirror assembly), and may project a beam of light to illuminate (such as at a greater intensity of light as compared to the broad illumination) a targeted portion of the interior of the vehicle (such as for map reading or the like). Also, for example, a light module of the present invention may be suitable for use in non-automotive lighting applications, such as residential lighting or commercial lighting or the like. For example, a light module of the present invention may be converted to replace a household or residential or commercial business or office building light bulb, whereby the light module may provide normal lighting (that broadly illuminates the area surrounding the light module) in addition to projection lighting, such as in a similar manner as described above. A light module for such an application may be similar to light module 510, discussed above, and may have a condenser and ground illumination lens that provide the desired range of illumination. For example, for a light bulb for a recessed light, the light bulb may provide illumination that covers a wide region below the light (so as to illuminate a desired or appropriate sized area or zone of a floor below the recessed light), and may provide an icon projected at a center (or non-centered) region of the ground or floor illumination. For example, such a light bulb may be disposed in a hallway and may provide broad illumination of the hallway, with a projected icon that provides directions or the like on the floor of the hallway to help a person find their targeted destination, such as in an office building or the like.

Optionally, the door handle assembly or mirror assembly or illumination module may include or may be associated with an antenna for receiving signals from or communicating with a remote device. For example, the antenna (such as, for example, an antenna of the types described in U.S. Pat. No. 6,977,619, which is hereby incorporated herein by reference in its entirety) may communicate a signal to the door locking system via a wire connection or the like, or wirelessly, such as via a radio frequency signal or via an infrared signal or via other wireless signaling means. Such connections can include cables, wires, fiber optic cables or the like. The communication to the locking system may be via a vehicle bus or multiplex system, such as a LIN (Local Interconnect Network) or CAN (Car or Controlled Area Network) system, such as described in U.S. Pat. Nos. 6,291,905; 6,396,408 and/or 6,477,464, which are all hereby incorporated herein by reference in their entireties. The vehicle door may then be unlocked and/or the illumination source or sources may be activated as a person carrying a remote signaling device approaches the door handle. Optionally, other systems may be activated in response to the remote signaling device, such as vehicle lighting systems, such as interior lights, security lights or the like (such as security lights of the types disclosed in U.S. Pat. Nos. 6,280,069; 6,276,821; 6,176,602; 6,152,590; 6,149,287; 6,139,172; 6,086,229; 5,938,321; 5,671,996; 5,497,305; 6,416,208 and/or 6,568,839, all of which are hereby incorporated herein by reference in their entireties), or the vehicle ignition, or any other desired system, while remaining within the spirit and scope of the present invention. The door handle and/or illumination module may be in communication with other systems and/or controls of the vehicle door and/or vehicle, such as by utilizing aspects of the door systems described in U.S. patent application Ser. No. 12/499,183, filed Jul. 8, 2009 and published Jan. 14, 2010 as U.S. Publication No. US-2010-0007463, which is hereby incorporated herein by reference in its entirety.

Figure 21:
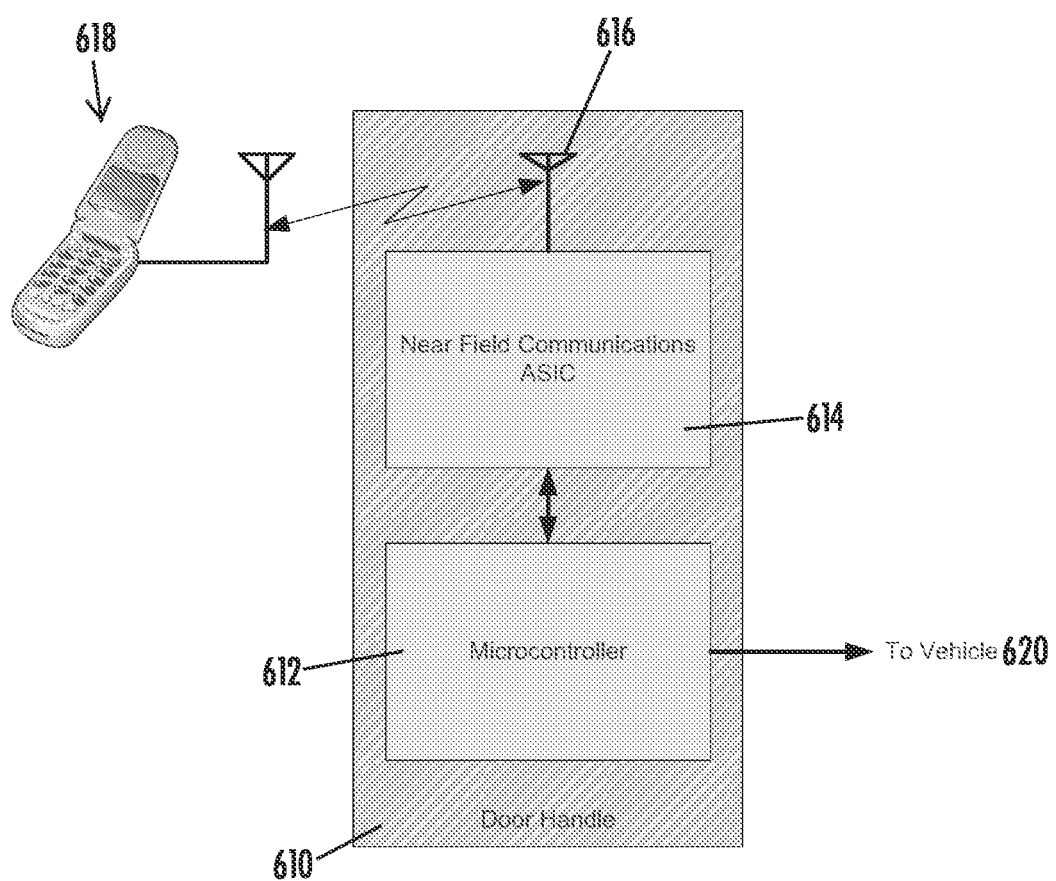
FIG. 21 is a schematic of a door handle-based near field communication system of the present invention.

Optionally, and with reference to FIG. 21, a vehicle door handle 610 (such as the driver side exterior door handle or passenger side exterior door handle or rear exterior door or liftgate handle or actuator at the side or rear of a vehicle) may include a microcontroller 612 and a near field communications Application Specific Integrated Chip (ASIC) 614 (which includes or is associated with an antenna 616), which are operable to communication with a remote transceiver 618, such as a cellular telephone or smartphone or the like (a smartphone, such as used herein, includes, for example, personal data devices, such as cellular phones or iPods or iPads or tablets or portable computing devices or the like, that communicate via linking to WiFi networks or cellular networks or the like), and a vehicle system or accessory 620. Near field communication (NFC) is a set of standards for smartphones and similar devices to establish radio communication with each other by touching them together or bringing them into close proximity.

In accordance with the present invention, a NFC-enabled smartphone 618 is authenticated to a user's vehicle via the controller and near field communication chip of the vehicle door handle. The process for this authentication may be done through the vehicle's center stack user interface or some other method of validating an authorized user. Once authenticated, the user can then approach the locked vehicle and place the smartphone in the vicinity of the NFC-enabled door handle. This action would wake up the door handle's NFC system and quickly identify the smartphone as an authorized user. After such identification is made, communication signals or messages can be sent to various or selected systems and/or accessories of the vehicle that would cause selected or desired actions, such as in a similar manner as what is done with a known key fob of a vehicle (such as unlocking doors, opening trunks or decklids, activating an alarm, activating one or more lights of the vehicle, starting the vehicle's engine and/or the like). Actions such as unlocking doors and loading personalization presets are common in vehicles, and could thus be controlled via a user's smartphone.

Thus, the communication system of the present invention includes a door handle that provides a communication link between a user or vehicle owner's smartphone and various or selected accessories or systems of the vehicle. A user can thus approach the vehicle (and the door handle), and when the smartphone is within a threshold distance of the door handle, the controller of the door handle may receive signals from (and may send signals to) the smartphone to identify the smartphone as an authorized user. After identification or verification of an authorized device, the smartphone may communicate signals to the handle controller, whereby the handle controller may control one or more accessories or systems of the vehicle. Although shown and described as having the control and near field communication chip incorporated in a vehicle door handle, it is envisioned that such a control and near field communication chip (which may be provided as a control module or unit or the like) may be located elsewhere at an exterior portion of a vehicle, such as at an exterior rearview mirror assembly of the vehicle (such as a driver side and/or passenger side exterior rearview mirror assembly) or the like, while remaining within the spirit and scope of the present invention. The control unit (such as a control at an exterior door handle or exterior mirror or the like) may communicate to the vehicle accessory/system via any suitable manner, such as via a wireless communication link or a wired communication link or via a vehicle communication network or bus or the like.

Optionally, the door handle assembly of the present invention may include a soft touch handle portion, such as utilizing the principles described in U.S. Pat. Nos. 6,349,450; 6,550,103 and 6,907,643, which are hereby incorporated herein by reference in their entireties. Optionally, the door handle assembly may include an antenna or the like, such as for sensing or transmitting signals, such as described in U.S. Pat. No. 6,977,619, which is hereby incorporated herein by reference in its entirety.

Optionally, the illumination module and/or an exterior rearview mirror assembly of the vehicle may incorporate a blind spot indicator device or element and/or a turn signal indicator device or element, such as by utilizing aspects of the devices described in U.S. Pat. Nos. 8,058,977; 7,944,371; 7,492,281; 6,198,409; 5,929,786 and/or 5,786,772, and/or U.S. patent application Ser. No. 12/187,725, filed Aug. 7, 2008, now U.S. Pat. No. 8,786,704, which are hereby incorporated herein by reference in their entireties. The signal indicator or indication module may include or utilize aspects of various light modules or systems or devices, such as the types described in U.S. Pat. Nos. 7,581,859; 6,227,689; 6,582,109; 5,371,659; 5,497,306; 5,669,699; 5,823,654; 6,176,602 and/or 6,276,821, and/or PCT Application No. PCT/US2006/018567, filed May 16, 2006 and published Nov. 23, 2006 as International Publication No. WO 2006/124682, which are hereby incorporated herein by reference in their entireties. Optionally, the exterior rearview mirror assembly may include a wide angle reflector at or integral with the reflective element, such as by utilizing aspects of the elements described in U.S. Pat. Nos. 7,748,856; 7,255,451; 7,195,381; 6,717,712; 7,126,456; 6,315,419; 7,097,312 and/or 6,522,451, and/or U.S. patent application Ser. No. 12/187,725, filed Aug. 7, 2008, now U.S. Pat. No. 8,786,704, which are hereby incorporated herein by reference in their entireties.

Changes and modifications to the specifically described embodiments may be carried out without departing from the principles of the present invention, which is intended to be limited only by the scope of the appended claims as interpreted according to the principles of patent law.

The invention claimed is:

1. A vehicular illumination system, said vehicular illumination system comprising:
an illumination module disposed at an exterior portion of a vehicle equipped with said vehicular illumination system;
wherein said illumination module comprises a light source operable to emit light;
wherein said illumination module comprises a reconfigurable display element;
wherein, when said light source is operated, light emitted by said light source passes through said reconfigurable display element and said illumination module projects an icon formed by said reconfigurable display element;
wherein said reconfigurable display element is reconfigurable to form the icon responsive to one selected from the group consisting of (i) a user selection and (ii) programming of said reconfigurable display element; and
wherein, when said light source is operated, light emitted by said light source passes through said reconfigurable display element and said illumination module projects the icon formed by said reconfigurable display element onto a surface exterior of the equipped vehicle.

2. The vehicular illumination system of claim 1, wherein said illumination module comprises a ground illumination module that illuminates a ground region adjacent the vehicle.

3. The vehicular illumination system of claim 1, wherein, when said light source is operated, light emitted by said light source passes through said reconfigurable display element and said illumination module projects the icon formed by said reconfigurable display element onto a ground surface exterior of the equipped vehicle.

4. The vehicular illumination system of claim 1, wherein said illumination module comprises a lens element, and wherein, when said light source is operated, light emitted by said light source passes through said reconfigurable display element and said lens element.

5. The vehicular illumination system of claim 1, wherein said illumination module comprises first and second optical lens elements, and wherein said reconfigurable display element is disposed between said first and second optical lens elements.

6. The vehicular illumination system of claim 5, wherein said second optical lens element is disposed between said reconfigurable display element and said light source.

7. The vehicular illumination system of claim 6, wherein said first optical lens element comprises a projecting lens element and said second optical lens element comprises a condensing lens element.

8. The vehicular illumination system of claim 7, wherein, when said light source is operated, light emanating from said light source (a) passes through a diffusing optic and through an illumination portion of said projecting lens element to provide lower intensity light at a target area, and (b) passes through said condensing lens element and is intensified by said condensing lens element so that light passing through a projecting portion of said projecting lens element is projected as higher intensity light onto a portion of the target area, and wherein said reconfigurable display element is disposed along an optic path between said condensing lens element and said projecting portion of said projecting lens element, and wherein the icon, when said light source is operated, is projected onto the portion of the target area.

9. The vehicular illumination system of claim 1, wherein said reconfigurable display element is reconfigurable to form the icon responsive to a user selection.

10. The vehicular illumination system of claim 1, wherein said reconfigurable display element is reconfigurable to form the icon responsive to programming of said reconfigurable display element.

11. The vehicular illumination system of claim 1, wherein said illumination module is disposed at an exterior rearview mirror assembly attached at a side of the equipped vehicle.

12. The vehicular illumination system of claim 11, wherein said illumination module is disposed at a lower portion of the exterior rearview mirror assembly attached at a side of the equipped vehicle, and wherein, when said light source is operated, said illumination module projects the icon formed by said reconfigurable display element onto the ground at the side of the equipped vehicle.

13. The vehicular illumination system of claim 1, wherein said illumination module is disposed at an exterior door handle assembly attached at a side of the equipped vehicle.

14. The vehicular illumination system of claim 1, wherein said light source comprises at least one light emitting diode.

15. The vehicular illumination system of claim 1, wherein said illumination module comprises a circuit element having said light source located thereat.

16. The vehicular illumination system of claim 15, comprising an electrical connector for electrically connecting circuitry of said circuit element to a power source of the equipped vehicle.

17. The vehicular illumination system of claim 1, wherein said reconfigurable display element is reconfigurable to form a security beacon.

18. The vehicular illumination system of claim 1, wherein said reconfigurable display element is reconfigurable to form an emblem.

19. The vehicular illumination system of claim 1, wherein said reconfigurable display element is reconfigurable to form a logo.

20. A vehicular illumination system, said vehicular illumination system comprising:
   an illumination module disposed at an exterior portion of a vehicle equipped with said vehicular illumination system;
   wherein said illumination module comprises a light source operable to emit light;
   wherein said light source comprises at least one light emitting diode;
   wherein said illumination module comprises a reconfigurable display element;
   wherein, when said light source is operated, light emitted by said light source passes through said reconfigurable display element and said illumination module projects a vehicle logo formed by said reconfigurable display element;
   wherein said reconfigurable display element is reconfigurable to form the vehicle logo responsive to one selected from the group consisting of (i) a user selection and (ii) programming of said reconfigurable display element; and
   wherein, when said light source is operated, light emitted by said light source passes through said reconfigurable display element and said illumination module projects the vehicle logo formed by said reconfigurable display element onto a surface exterior of the equipped vehicle.

21. The vehicular illumination system of claim 20, wherein the vehicle logo comprises a brand name associated with the vehicle.

22. The vehicular illumination system of claim 20, wherein the vehicle logo comprises a manufacturer logo for the vehicle.

23. The vehicular illumination system of claim 20, wherein said illumination module comprises a ground illumination module that illuminates a ground region adjacent the vehicle.

24. The vehicular illumination system of claim 20, wherein, when said light source is operated, light emitted by said light source passes through said reconfigurable display element and said illumination module projects the vehicle logo formed by said reconfigurable display element onto a ground surface exterior of the equipped vehicle.

25. The vehicular illumination system of claim 24, wherein said illumination module is disposed at an exterior rearview mirror assembly attached at a side of the equipped vehicle.

26. The vehicular illumination system of claim 20, wherein said reconfigurable display element is reconfigurable to form the vehicle logo responsive to a user selection.

27. The vehicular illumination system of claim 20, wherein said reconfigurable display element is reconfigurable to form the vehicle logo responsive to programming of said reconfigurable display element.

28. The vehicular illumination system of claim 20, wherein said illumination module is disposed at an exterior door handle assembly attached at a side of the equipped vehicle.

29. A vehicular illumination system, said vehicular illumination system comprising:
   an illumination module disposed at an exterior portion of a vehicle equipped with said vehicular illumination system;
   wherein said illumination module comprises a light source operable to emit light;
   wherein said illumination module comprises a circuit element having said light source located thereat;
   wherein said light source comprises at least one light emitting diode;
   wherein said illumination module comprises an electrical connector for electrically connecting circuitry of said circuit element to a power source of the equipped vehicle;
   wherein said illumination module comprises a reconfigurable display element;
   wherein, when said light source is operated, light emitted by said light source passes through said reconfigurable display element and said illumination module projects an icon formed by said reconfigurable display element;
   wherein said reconfigurable display element is reconfigurable to form the icon responsive to one selected from the group consisting of (i) a user selection and (ii) programming of said reconfigurable display element; and
   wherein, when said light source is operated, light emitted by said light source passes through said reconfigurable display element and said illumination module projects the icon formed by said reconfigurable display element onto a surface exterior of the equipped vehicle.

30. The vehicular illumination system of claim 29, wherein said illumination module comprises a ground illumination module that illuminates a ground region adjacent the vehicle.

31. The vehicular illumination system of claim 29, wherein, when said light source is operated, light emitted by said light source passes through said reconfigurable display element and said illumination module projects the icon formed by said reconfigurable display element onto a ground surface exterior of the equipped vehicle.

32. The vehicular illumination system of claim 31, wherein said illumination module is disposed at an exterior rearview mirror assembly attached at a side of the equipped vehicle.

33. The vehicular illumination system of claim 29, wherein said illumination module is disposed at an exterior door handle assembly attached at a side of the equipped vehicle.

34. The vehicular illumination system of claim 29, wherein said reconfigurable display element is reconfigurable to form the icon responsive to a user selection.

35. The vehicular illumination system of claim 29, wherein said reconfigurable display element is reconfigurable to form the icon responsive to programming of said reconfigurable display element.

36. The vehicular illumination system of claim 29, wherein said reconfigurable display element is reconfigurable to form an emblem.

37. The vehicular illumination system of claim 29, wherein said reconfigurable display element is reconfigurable to form a logo.

* * * * *